(12) United States Patent
Goto et al.

(10) Patent No.: US 8,460,449 B2
(45) Date of Patent: Jun. 11, 2013

(54) WATER-BASED INK SET FOR INK JET RECORDING, INK CARTRIDGE, AND INK-JET RECORDING APPARATUS

(75) Inventors: Kazuma Goto, Nagoya (JP); Kenta Hayashida, Inazawa (JP); Mitsunori Maeda, Nagoya (JP); Akiko Miyajima, Aichi (JP)

(73) Assignee: Brother Kogyo Kabushiki Kaisha, Nagoya-shi (JP)

(*) Notice: Subject to any disclaimer, the term of this patent is extended or adjusted under 35 U.S.C. 154(b) by 314 days.

(21) Appl. No.: 12/888,913

(22) Filed: Sep. 23, 2010

(65) Prior Publication Data

US 2011/0128333 A1 Jun. 2, 2011

(30) Foreign Application Priority Data

Nov. 30, 2009 (JP) ................................. 2009-272394

(51) Int. Cl.
*C09D 11/02* (2006.01)

(52) U.S. Cl.
USPC .................................... 106/31.48; 106/31.47

(58) Field of Classification Search
USPC .................. 106/31.48, 31.47, 31.49; 347/100
See application file for complete search history.

(56) References Cited

U.S. PATENT DOCUMENTS 5,367,075 A 11/1994 Nakamatsu et al.
5,599,386 A 2/1997 Sano et al.

(Continued)

FOREIGN PATENT DOCUMENTS

EP 1985668 A1 10/2008
EP 1988134 A2 11/2008

(Continued)

OTHER PUBLICATIONS

Extended European search report for application No. 10252012.9 mailed Mar. 16, 2011.

(Continued)

*Primary Examiner* — Helene Klemanski
(74) *Attorney, Agent, or Firm* — Banner & Witcoff, Ltd.

(57) ABSTRACT

A water-based ink set includes a yellow ink, a magenta ink, and a cyan ink, each including a coloring agent, water, and a water-soluble organic solvent. The yellow ink includes dyes (Y-1) and (Y-2), the magenta ink includes dyes (M-1) and (M-2), and the cyan ink includes a dye (C-1).

Dye (Y-1): a dye represented by the formula (Y-1)

Dye (Y-2): at least one dye selected from the group consisting of C. I. Direct Yellow 86, C. I. Direct Yellow 132, and C. I. Direct Yellow 142

Dye (M-1): a dye represented by the formula (M-1)

Dye (M-2): at least one dye selected from the group consisting of dyes represented by a formula (M-2a), dyes represented by the formula (M-2b), C. I. Acid Red 1, and C. I. Acid Red 254

Dye (C-1): a dye represented by the formula (C-1).

-continued
(M-1)
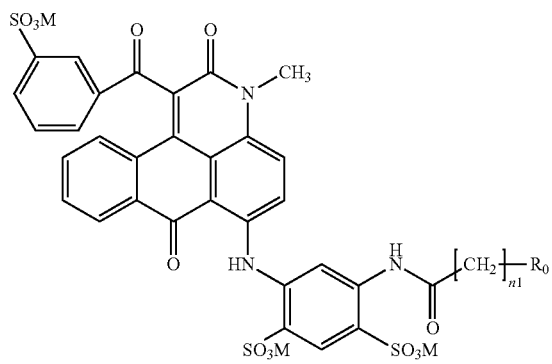
(M-2a)
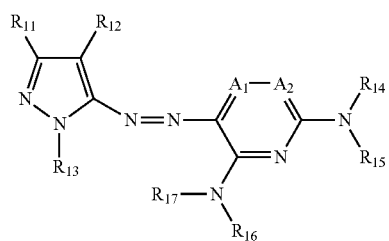
(M-2b)
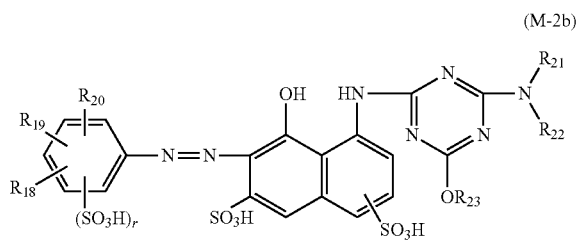
(C-1)
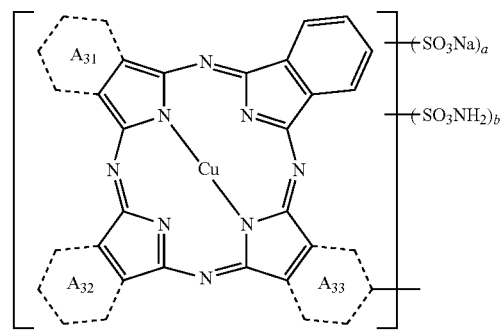
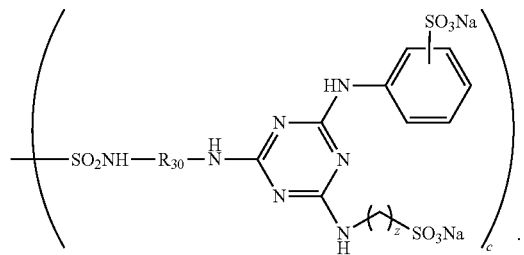
9 Claims, 1 Drawing Sheet

U.S. PATENT DOCUMENTS

| | | | |
|---|---|---|---|
| 5,609,673 A | 3/1997 | Takimoto et al. | |
| 5,795,375 A | 8/1998 | Yamazaki et al. | |
| 6,365,720 B1 | 4/2002 | Schacht et al. | |
| 6,444,807 B1 | 9/2002 | Wolleb et al. | |
| 6,488,751 B1 | 12/2002 | Takemoto | |
| 6,495,250 B1 | 12/2002 | Schacht et al. | |
| 7,270,701 B2 | 9/2007 | Jinnou et al. | |
| 7,303,618 B1 | 12/2007 | Taga et al. | |
| 7,425,233 B2 | 9/2008 | Hamajima et al. | |
| 7,476,270 B2 | 1/2009 | McGorrin | |
| 7,566,362 B2* | 7/2009 | Mori et al. | 106/31.48 |
| 7,585,361 B2 | 9/2009 | Yoneda et al. | |
| 7,591,888 B2 | 9/2009 | Fujii et al. | |
| 7,611,571 B2 | 11/2009 | Yamashita et al. | |
| 7,632,344 B2 | 12/2009 | McGorrin | |
| 7,674,329 B2 | 3/2010 | Koga et al. | |
| 7,713,343 B2* | 5/2010 | Goto et al. | 106/31.48 |
| 7,727,321 B2 | 6/2010 | Goto et al. | |
| 7,854,797 B2 | 12/2010 | Fujii et al. | |
| 7,871,464 B2* | 1/2011 | Ono et al. | 106/31.47 |
| 8,226,222 B2* | 7/2012 | Kajiura et al. | 347/100 |
| 2003/0105321 A1 | 6/2003 | Wolleb et al. | |
| 2004/0089200 A1 | 5/2004 | Fujiwara et al. | |
| 2004/0122219 A1 | 6/2004 | Fujiwara et al. | |
| 2005/0057629 A1 | 3/2005 | Taguchi et al. | |
| 2005/0104944 A1 | 5/2005 | Robertson et al. | |
| 2005/0115458 A1 | 6/2005 | Oki et al. | |
| 2005/0115459 A1 | 6/2005 | Hanmura et al. | |
| 2005/0215773 A1 | 9/2005 | Tateishi et al. | |
| 2006/0016026 A1 | 1/2006 | Tateishi et al. | |
| 2006/0156951 A1 | 7/2006 | Patel | |
| 2007/0173641 A1 | 7/2007 | Fujiwara et al. | |
| 2007/0263055 A1 | 11/2007 | Kitamura et al. | |
| 2008/0241398 A1 | 10/2008 | Kato et al. | |
| 2008/0274284 A1 | 11/2008 | Fujimoto et al. | |
| 2008/0274286 A1 | 11/2008 | Yamashita et al. | |
| 2009/0000511 A1 | 1/2009 | Kitamura et al. | |
| 2009/0029120 A1 | 1/2009 | Fujii et al. | |
| 2009/0151599 A1* | 6/2009 | Fujii et al. | 106/31.47 |
| 2009/0202798 A1 | 8/2009 | Patel | |
| 2010/0112218 A1* | 5/2010 | Fujii et al. | 106/31.47 |
| 2010/0209678 A1 | 8/2010 | Ono et al. | |
| 2010/0251933 A1* | 10/2010 | Dodge et al. | 106/31.48 |
| 2011/0032302 A1 | 2/2011 | Kajiura et al. | |
| 2011/0128331 A1* | 6/2011 | Hayashida et al. | 106/31.49 |
| 2011/0128332 A1* | 6/2011 | Maeda et al. | 106/31.48 |
| 2011/0128333 A1 | 6/2011 | Goto et al. | |
| 2012/0081453 A1* | 4/2012 | Tsuzaka et al. | 106/31.48 |
| 2012/0081454 A1 | 4/2012 | Ito et al. | |

FOREIGN PATENT DOCUMENTS

| | | |
|---|---|---|
| EP | 2017309 A1 | 1/2009 |
| EP | 2128202 | 2/2009 |
| EP | 2206747 | 7/2010 |
| JP | 03-103484 A | 4/1991 |
| JP | 07-278478 A | 10/1995 |
| JP | 08-073791 A | 3/1996 |
| JP | 08-311375 A | 11/1996 |
| JP | 09-137098 A | 5/1997 |
| JP | 09-202043 A | 8/1997 |
| JP | 09-235484 A | 9/1997 |
| JP | 09-241555 A | 9/1997 |
| JP | 2000-178491 | 6/2000 |
| JP | 2000-265099 A | 9/2000 |
| JP | 2000-303009 A | 10/2000 |
| JP | 2002-526589 A | 8/2002 |
| JP | 2002-371079 A | 12/2002 |
| JP | 2002-371214 A | 12/2002 |
| JP | 2003-213168 A | 7/2003 |
| JP | 2003-231823 A | 8/2003 |
| JP | 2004-002670 A | 1/2004 |
| JP | 2005-075778 A | 3/2005 |
| JP | 2005-520029 A | 7/2005 |
| JP | 2006-503148 A | 1/2006 |
| JP | 2006-028450 A | 2/2006 |
| JP | 2007-277416 A | 10/2007 |
| JP | 2008-013706 A | 1/2008 |
| JP | 2008202011 | 9/2008 |
| JP | 2008-246821 | 10/2008 |
| JP | 2009-057540 A | 3/2009 |
| WO | 2007091631 A1 | 8/2007 |
| WO | 2007144586 A2 | 12/2007 |
| WO | 2008-111635 | 9/2008 |
| WO | 2009054829 A1 | 4/2009 |
| WO | 2009-060654 | 5/2009 |
| WO | 2009119656 A1 | 10/2009 |

OTHER PUBLICATIONS

Extended European search report for application No. 10252010.3 mailed Mar. 4, 2011.

Extended EP Search Report dtd Mar. 15, 2011, EP app. 10252011.1-2102.

* cited by examiner

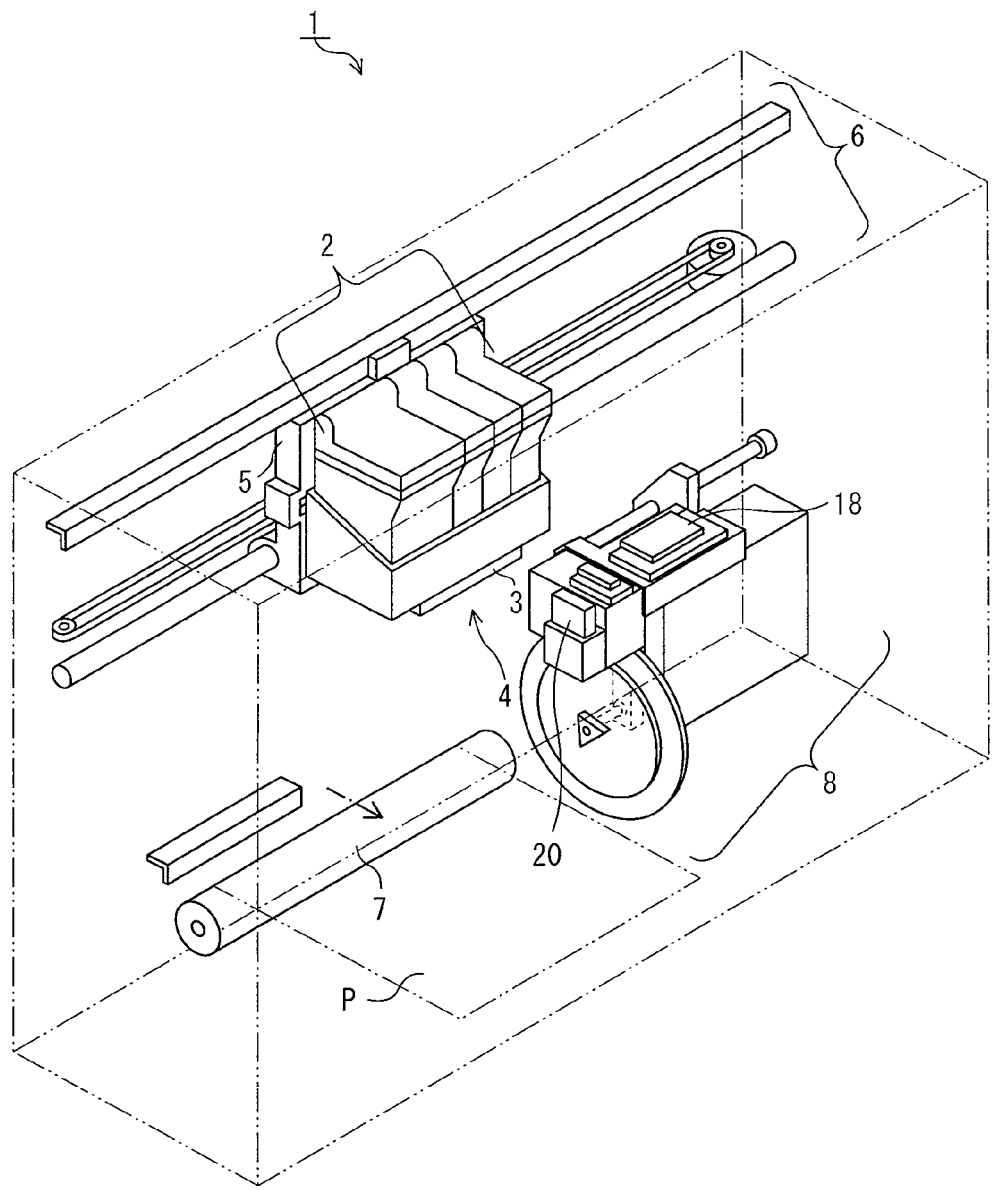

WATER-BASED INK SET FOR INK JET RECORDING, INK CARTRIDGE, AND INK-JET RECORDING APPARATUS

CROSS-REFERENCE TO RELATED APPLICATION

This application claims priority from Japanese Patent Application No. 2009-272394 filed on Nov. 30, 2009. The entire subject matter of the Japanese Patent Application is incorporated herein by reference.

BACKGROUND

A water-based ink set for ink-jet recording generally is required (1) to provide images that are bright and have superior color developing properties; (2) to have superior fastness such as light resistance, active gas (for example, $NO_x$, oxidizing gas such as ozone, and $SO_x$) resistance, and water resistance; (3) to cause no problem even when the water-based ink set contacts with various components used in an ink-jet recording apparatus; (4) to have superior storing stability, to hardly cause clogging of a nozzle of an ink-jet head even when the water-based ink set is used for a long period of time, and to maintain sufficient ejection stability, at high levels.

Further, in an ink set containing inks of three colors of yellow, magenta, and cyan, it is strongly required that hues of the inks of the respective colors are similar to the standard hues and are bright as a water-based ink set for ink-jet recording in the case when natural images and the like are expressed by mixed colors. Furthermore, recorded natural images and the like are required to have favorable long-term storing stability with which favorable color developing properties and a high optical density can be maintained. Therefore, it is important that the water-based ink set has not only sufficiently superior fastness such as light resistance and active gas resistance, but also hues in balance. That is, it is important that degrees of fading of the respective color inks are the same.

However, a conventional ink set had a problem in fastness such as light resistance, ozone resistance, and the like in any of the respective color inks. Therefore there was a problem that a hue balance after fading of color in a recorded object becomes worse.

SUMMARY

A water-based ink set for ink-jet recording comprises: a water-based yellow ink; a water-based magenta ink; and a water-based cyan ink. The water-based yellow ink contains a yellow coloring agent, water, and a water-soluble organic solvent, and the yellow coloring agent contains the following dye (Y-1) and the following yellow dye (Y-2). The water-based magenta ink contains a magenta coloring agent, water, and a water-soluble organic solvent, and the magenta coloring agent contains the following magenta dye (M-1) and the following magenta dye (M-2). The water-based cyan ink contains a cyan coloring agent, water, and a water-soluble organic solvent, and the cyan coloring agent contains the following cyan dye (C-1).

Yellow dye (Y-1): a dye represented by the general formula (Y-1)

Yellow dye (Y-2): at least one dye selected from the group consisting of C. I. Direct Yellow 86, C. I. Direct Yellow 132, and C. I. Direct Yellow 142

Magenta dye (M-1): a dye represented by the general formula (M-1)

Magenta dye (M-2): at least one dye selected from the group consisting of dyes represented by the general formula (M-2a), dyes represented by the general formula (M-2b), C. I. Acid Red 1, and C. I. Acid Red 254

Cyan dye (C-1): a dye represented by the general formula (C-1)

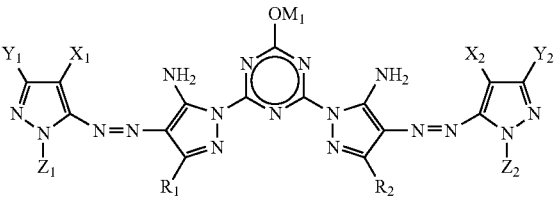

(Y-1)

In the general formula (Y-1),
$R_1$, $R_2$, $Y_1$, and $Y_2$ each represent a monovalent group, and may be identical to or different from each other;
$X_1$ and $X_2$ each represent an electron attractive group, and may be identical to or different from each other;
$Z_1$ and $Z_2$ each represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and may be identical to or different from each other; and
$M_1$ represents a hydrogen atom or a cation.

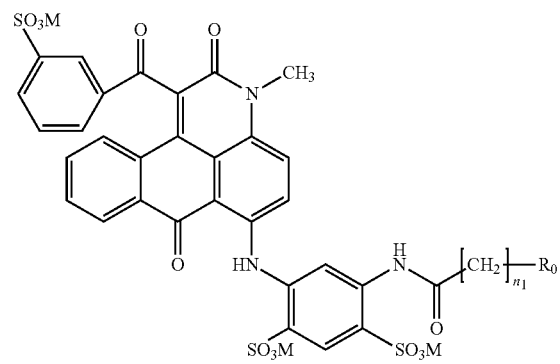

(M-1)

In the general formula (M-1),
$n_1$ is 1 or 2;
three Ms each represent sodium or ammonium, and may be identical to or different from each other; and
$R_0$ represents a monoalkylamino group having 1 to 8 carbon atoms, substituted with a carboxy group.

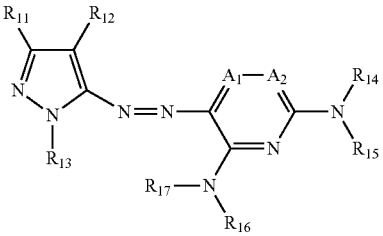

(M-2a)

In the general formula (M-2a), $R_{11}$ represents a hydrogen atom, a substituted or unsubstituted alkyl group, or a substituted or unsubstituted aryl group;

$R_{12}$ represents a hydrogen atom, a halogen atom, or a cyano group;

$R_{13}$ represents a hydrogen atom, a substituted or unsubstituted alkyl group, a substituted or unsubstituted aryl group, or a substituted or unsubstituted heterocyclic group;

$R_{14}$, $R_{15}$, $R_{16}$, and $R_{17}$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, and may be identical to or different from each other, provided that $R_{14}$ and $R_{15}$ are not both hydrogen atoms, and that $R_{16}$ and $R_{17}$ are not both hydrogen atoms; and $A_1$ and $A_2$ are both substituted or unsubstituted carbon atoms, or one of $A_1$ and $A_2$ is a substituted or unsubstituted carbon atom and the other is a nitrogen atom.

ester group, a substituted or unsubstituted alkylsulfonyl group, a substituted or unsubstituted arylsulfonyl group, a carboxyl group, or a carboxylic acid ester group, and may be identical to or different from each other; and $R_{21}$, $R_{22}$, and $R_{23}$ each represent a hydrogen atom, a substituted or unsubstituted alkyl group, a substituted or unsubstituted alkenyl group, a substituted or unsubstituted aryl group, a substituted or unsubstituted aralkyl group, a substituted or unsubstituted alicyclic group, or a substituted or unsubstituted heterocyclic group, and may be identical to or different from each other.

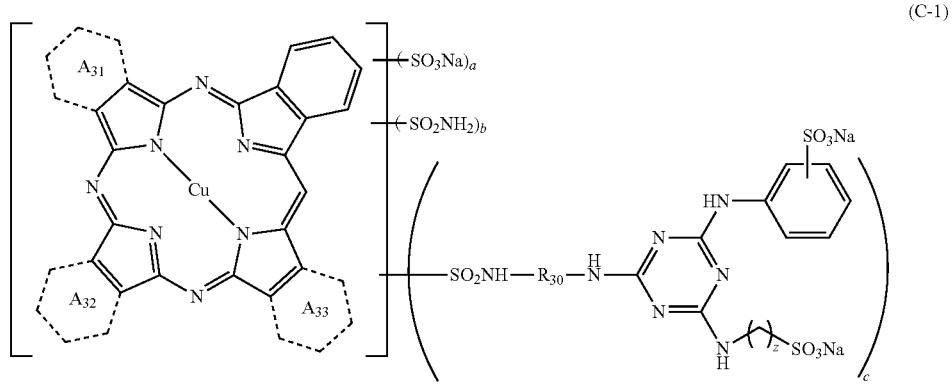

(C-1)

In the general formula (C-1), rings $A_{31}$, $A_{32}$, and $A_{33}$ each represent at least one selected from the group consisting of a benzene ring, a 2,3-pyridine ring, and a 3,2-pyridine ring; at least one of rings $A_{31}$, $A_{32}$, and $A_{33}$ represents a 2,3-pyridine ring or a 3,2-pyridine ring; and the rings $A_{31}$, $A_{32}$, and $A_{33}$ may be identical to or different from each other;

a satisfies $0 \leq a \leq 4$; b satisfies $0 \leq b \leq 4$; c satisfies $0 \leq c \leq 4$; a, b, and c satisfy $0 \leq a+b+c \leq 4$;

z is an integer satisfying $1 \leq z \leq 3$; and $R_{30}$ represents a straight chain alkyl group having 1 to 6 carbon atoms.

An ink cartridge comprises containing portions for the water-based yellow ink, the water-based magenta ink, and the water-based cyan ink, respectively. The water-based yellow ink, the water-based magenta ink, and the water-based cyan ink are the water-based yellow ink, the water-based magenta ink, and the water-based cyan ink in the aforementioned water-based ink set for ink-jet recording, respectively.

An ink-jet recording apparatus comprises: an ink storing portion; and an ink ejecting unit. An ink stored in the ink storing portion is ejected by the ink ejection unit. The ink cartridge is stored in the ink storing portion.

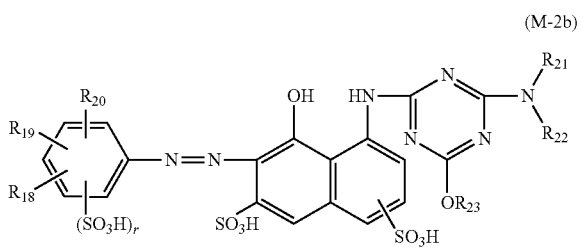

(M-2b)

In the general formula (M-2b), r is 0, 1, or 2;

$R_{18}$, $R_{19}$, and $R_{20}$ each represent a substituted or unsubstituted alkyl group, a substituted or unsubstituted alkoxy group, a halogen atom, a hydrogen atom, a hydroxyl group, a substituted or unsubstituted carbamoyl group, a substituted or unsubstituted sulfamoyl group, a substituted or unsubstituted amide group, a nitro group, a sulfonic acid

BRIEF DESCRIPTION OF THE DRAWING

FIG. 1 is a schematic perspective view showing an example of the configuration of the ink-jet recording apparatus.

DETAILED DESCRIPTION

The water-based ink set for ink-jet recording (hereinafter, this may also be referred to simply as the "water-based ink set" or the "ink set") will be described. The water-based ink set includes a water-based yellow ink, a water-based magenta ink, and a water-based cyan ink.

(Water-Based Yellow Ink)

The water-based yellow ink will be described. As mentioned above, the water-based yellow ink contains a yellow coloring agent, water, and a water-soluble organic solvent. The yellow coloring agent contains the yellow dye (Y-1) and the yellow dye (Y-2).

As mentioned above, the yellow dye (Y-1) is a dye represented by the general formula (Y-1).

In the general formula (Y-1), $R_1$, $R_2$, $Y_1$, and $Y_2$ each represent a monovalent group, and may be identical to or different from each other. The monovalent group is a hydrogen atom, or a monovalent substituent. Examples of the monovalent substituent include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxy carbonyloxy group, an aryloxycarbonyloxy group, an amino group such as an alkylamino group or an arylamino group, an amide group, an acylamino group, an ureido group, an amino carbonyl amino group, an alkoxy carbonyl amino group, an aryloxycarbonyl amino group, a sulfamoyl amino group, an alkyl sulfonyl amino group, an aryl sulfonyl amino group, an alkylthio group, an arylthio group, a heterocyclic thio group, a sulfamoyl group, an alkyl sulfinyl group, an aryl sulfinyl group, an alkyl sulfonyl group, an aryl sulfonyl group, an acyl group, an aryloxycarbonyl group, an alkoxy carbonyl group, a carbamoyl group, a phosphino group, a phosphinyl group, a phosphinyloxy group, a phosphinyl amino group, a silyl group, an azo group, an imide group, and the like. Each may further have a substituent. Out of these, the monovalent substituent may be a hydrogen atom, a halogen atom, an alkyl group, an aryl group, a heterocyclic group, a cyano group, an alkoxy group, an amide group, an ureido group, an alkyl sulfonyl amino group, an aryl sulfonyl amino group, a sulfamoyl group, an alkyl sulfonyl group, an aryl sulfonyl group, a carbamoyl group, or an alkoxy carbonyl group. Further, the monovalent substituent may be a hydrogen atom, an alkyl group, an aryl group, a cyano group, or an alkyl sulfonyl group.

In the general formula (Y-1), the halogen atom is a chlorine atom, a bromine atom, or an iodine atom. Out of these, the halogen atom may be a chlorine atom or a bromine atom.

In the general formula (Y-1), the alkyl group includes a substituted or unsubstituted alkyl group. The substituted or unsubstituted alkyl group may be an alkyl group having 1 to 30 carbon atoms. Examples of the alkyl group include a methyl group, an ethyl group, a butyl group, a tert-butyl group, a n-octyl group, an eicoxy group, a 2-chloroethyl group, a hydroxyethyl group, a cyano ethyl group, a 4-sulfobutyl group, and the like. Examples of the substituent of the substituted alkyl group include a straight or branched chain alkyl group having 1 to 12 carbon atoms such as a methyl group, an ethyl group, a propyl group, an isopropyl group, a sec-butyl group, a tert-butyl group, a 2-ethylhexyl group, a 2-methyl sulfonyl ethyl group, a 3-phenoxypropyl group, a trifluoromethyl group, or the like; a straight or branched chain aralkyl group having 7 to 18 carbon atoms; a straight or branched chain alkenyl group having 2 to 12 carbon atoms; a straight or branched chain alkynyl group having 2 to 12 carbon atoms; a straight or branched chain cycloalkyl group having 3 to 12 carbon atoms such as a cyclopentyl group or the like; a straight or branched chain cycloalkenyl group having 3 to 12 carbon atoms; a halogen atom such as a chlorine atom, a bromine atom, or the like; an aryl group such as a phenyl group, a 4-tert-butylphenyl group, a 2,4-di-tert-amyl phenyl group, or the like; a heterocyclic group such as an imidazolyl group, a pyrazolyl group, a triazolyl group, a 2-furyl group, a 2-thienyl group, a 2-pyrimidinyl group, a 2-benzothiazolyl group, or the like; a cyano group; a hydroxyl group; a nitro group; a carboxyl group; an amino group; an alkoxy group such as a methoxy group, an ethoxy group, a 2-methoxyethoxy group, a 2-methyl sulfonyl ethoxy group, or the like; an aryloxy group such as a phenoxy group, a 2-methyl phenoxy group, a 4-tert-butyl phenoxy group, a 3-nitro phenoxy group, a 3-tert-butyloxy carbonyl phenoxy group, a 3-methoxy carbonylphenyloxy group, or the like; an acylamino group such as an acetamide group, a benzamide group, a 4-(3-tert-butyl-4-hydroxy phenoxy)butaneamide group, or the like; an alkylamino group such as a methylamino group, a butylamino group, a diethylamino group, a methyl butylamino group, or the like; an aryl amino group such as a phenyl amino group, a 2-chloroanilino group, or the like; an ureido group such as a phenylureido group, a methylureido group, an N,N-dibutylureido group, or the like; a sulfamoyl amino group such as an N,N-dipropyl sulfamoyl amino group or the like; an alkyl thio group such as a methyl thio group, an octyl thio group, a 2-phenoxyethyl thio group, or the like; an aryl thio group such as a phenyl thio group, a 2-butoxy-5-tert-octylphenyl thio group, a 2-carboxy phenyl thio group, or the like; an alkoxy carbonyl amino group such as a methoxy carbonyl amino group or the like; an alkyl sulfonyl amino group such as a methyl sulfonyl amino group or the like; an aryl sulfonyl amino group such as a phenyl sulfonyl amino group, a p-toluene sulfonyl amino group, or the like; a carbamoyl group such as an N-ethyl carbamoyl group, an N,N-dibutyl carbamoyl group, or the like; a sulfamoyl group such as an N-ethyl sulfamoyl group, an N,N-dipropyl sulfamoyl group, an N-phenyl sulfamoyl group, or the like; a sulfonyl group such as a methyl sulfonyl group, an octyl sulfonyl group, a phenyl sulfonyl group, a p-toluene sulfonyl group, or the like; an alkoxy carbonyl group such as a methoxy carbonyl group, a butyloxy carbonyl group, or the like; a heterocyclic oxy group such as a 1-phenyltetrazol-5-oxy group, a 2-tetrahydropyranyloxy group, or the like; an azo group such as a phenylazo group, a 4-methoxyphenyl azo group, a 4-pivaloylamino phenylazo group, a 2-hydroxy-4-propanoyl phenylazo group, or the like; an acyloxy group such as an acetoxy group or the like; a carbamoyloxy group such as an N-phenylcarbamoyloxy group or the like; a silyloxy group such as a trimethyl silyloxy group, a dibutyl methyl silyloxy group, or the like; an aryloxy carbonyl amino group such as a phenoxy carbonyl amino group or the like; an imide group such as an N-succinimide group, an N-phthalimide group, or the like; a heterocyclic thio group such as a 2-benzothiazolyl thio group, a 2,4-di-phenoxy-1,3,5-triazole-6-thio group, a 2-pyridylthio group, or the like; a sulfinyl group such as a 3-phenoxypropyl sulfinyl group or the like; a phosphonyl group such as a phenoxy phosphonyl group, an octyloxy phosphonyl group, a phenyl phosphonyl group, or the like; an aryloxy carbonyl group such as a phenoxy carbonyl group or the like; an acyl group such as an acetyl group, a 3-phenyl propanoyl group, a benzoyl group, or the like; and an ionic hydrophilic group such as a carboxyl group, a sulfo group, a phosphono group, a quaternary ammonium group, or the like; and the like. With respect to the alkyl group, the aralkyl group, the alkenyl group, the alkynyl group, the cycloalkyl group, and the cycloalkenyl group, which are the substituents of the substituted alkyl group, those having branched chains may be used because they improve the solubility of the dye and the stability of the water-based yellow ink, and those having asymmetric carbons may be used. Out of these, a hydroxy group, an alkoxy group, a cyano group, a halogen atom, a sulfo group (which may also be in the form of a salt) or a carboxyl group (which may also be in the form of a salt) may be used.

In the general formula (Y-1), the cycloalkyl group includes a substituted or unsubstituted cycloalkyl group. The substituted or unsubstituted cycloalkyl group may be a cycloalkyl group having 5 to 30 carbon atoms. Examples of the substituent of the substituted cycloalkyl group include the substituents described for the substituted alkyl group. Examples of the cycloalkyl group include a cyclohexyl group, a cyclopentyl group, a 4-n-dodecyl cyclohexyl group, and the like.

In the general formula (Y-1), the aralkyl group includes a substituted or unsubstituted aralkyl group. The substituted or unsubstituted aralkyl group may be an aralkyl group having 7 to 30 carbon atoms. Examples of the substituent of the substituted aralkyl group include the substituents described for the substituted alkyl group. Examples of the aralkyl group include a benzyl group, a 2-phenethyl group, and the like.

In the general formula (Y-1), the alkenyl group is a straight chain, branched, or cyclic substituted or unsubstituted alkenyl group. The alkenyl group may be an alkenyl group having 2 to 30 carbon atoms. Examples of the substituent of the substituted alkenyl group include the substituents described for the substituted alkyl group. Examples of the alkenyl group include a vinyl group, an allyl group, a prenyl group, a geranyl group, an oleyl group, a 2-cyclopentene-1-yl group, a 2-cyclohexene-1-yl group, and the like.

In the general formula (Y-1), the alkynyl group is a substituted or unsubstituted alkynyl group having 2 to 30 carbon atoms. Examples of the substituent of the substituted alkynyl group include the substituents described for the substituted alkyl group. Examples of the alkynyl group include an ethynyl group, a propargyl group, and the like.

In the general formula (Y-1), the aryl group is a substituted or unsubstituted aryl group having 6 to 30 carbon atoms. Examples of the aryl group include a phenyl group, a p-tolyl group, a naphthyl group, a m-chlorophenyl group, an o-hexadecanoyl aminophenyl group, and the like. Examples of the substituent of the substituted aryl group include the substituents described for the substituted alkyl group.

In the general formula (Y-1), the heterocyclic group is a monovalent group obtained by removing one hydrogen atom from a 5- or 6-membered substituted or unsubstituted, aromatic or nonaromatic heterocyclic compound, which may also be further condensed. The heterocyclic group may be a 5- or 6-membered aromatic heterocyclic group having 3 to 30 carbon atoms. Examples of the substituent of the substituted heterocyclic group include the substituents described for the substituted alkyl group. Examples of the heterocyclic group include, with no limitation on a substitution site, a pyridine group, a pyrazine group, a pyridazine group, a pyrimidine group, a triazine group, a quinoline group, an isoquinoline group, a quinazoline group, a cinnoline group, a phthalazine group, a quinoxaline group, a pyrrole group, an indole group, a furan group, a benzofuran group, a thiophene group, a benzothiophene group, a pyrazole group, an imidazole group, a benzimidazole group, a triazole group, an oxazole group, a benzoxazole group, a thiazole group, a benzothiazole group, an isothiazole group, a benzisothiazole group, a thiadiazole group, an isoxazole group, a benzisoxazole group, a pyrrolidine group, a piperidine group, a piperazine group, an imidazolidine group, a thiazoline group, and the like.

In the general formula (Y-1), the alkoxy group includes a substituted or unsubstituted alkoxy group. The substituted or unsubstituted alkoxy group may be an alkoxy group having 1 to 30 carbon atoms. Examples of the substituent of the substituted alkoxy group include the substituents described for the substituted alkyl group. Examples of the alkoxy group include a methoxy group, an ethoxy group, an isopropoxy group, a n-octyloxy group, a methoxyethoxy group, a hydroxyethoxy group, a 3-carboxy propoxy group, and the like.

In the general formula (Y-1), the aryloxy group may be a substituted or unsubstituted aryloxy group having 6 to 30 carbon atoms. Examples of the substituent of the substituted aryloxy group include the substituents described for the substituted alkyl group. Examples of the aryloxy group include a phenoxy group, a 2-methyl phenoxy group, a 4-tert-butyl phenoxy group, a 3-nitro phenoxy group, a 2-tetradecanoyl amino phenoxy group, and the like.

In the general formula (Y-1), the silyloxy group may be a silyloxy group having 3 to 20 carbon atoms. Examples of the silyloxy group include a trimethyl silyloxy group, a tert-butyldimethyl silyloxy group, and the like.

In the general formula (Y-1), the heterocyclic oxy group may be a substituted or unsubstituted heterocyclic oxy group having 2 to 30 carbon atoms. Examples of the substituent of the substituted heterocyclic oxy group include the substituents described for the substituted alkyl group. Examples of the heterocyclic oxy group include a 1-phenyltetrazol-5-oxy group, a 2-tetrahydropyranyloxy group, and the like.

In the general formula (Y-1), the acyloxy group may be a formyloxy group, a substituted or unsubstituted alkyl carbonyloxy group having 2 to 30 carbon atoms, or a substituted or unsubstituted aryl carbonyloxy group having 6 to 30 carbon atoms. Examples of the substituents of the substituted alkyl carbonyloxy group and the substituted aryl carbonyloxy group include the substituents described for the substituted alkyl group. Examples of the acyloxy group include a formyloxy group, an acetyloxy group, a pivaloyloxy group, a stearoyloxy group, a benzoyloxy group, a p-methoxyphenyl carbonyloxy group, and the like.

In the general formula (Y-1), the carbamoyloxy group may be a substituted or unsubstituted carbamoyloxy group having 1 to 30 carbon atoms. Examples of the substituent of the substituted carbamoyloxy group include the substituents described for the substituted alkyl group. Examples of the carbamoyloxy group include an N,N-dimethyl carbamoyloxy group, an N,N-diethyl carbamoyloxy group, a morpholino carbonyloxy group, an N,N-di-n-octyl amino carbonyloxy group, an N-n-octyl carbamoyloxy group, and the like.

In the general formula (Y-1), the alkoxy carbonyloxy group may be a substituted or unsubstituted alkoxy carbonyloxy group having 2 to 30 carbon atoms. Examples of the substituent of the substituted alkoxy carbonyloxy group include the substituents described for the substituted alkyl group. Examples of the alkoxy carbonyloxy group include a methoxy carbonyloxy group, an ethoxy carbonyloxy group, a tert-butoxy carbonyloxy group, a n-octyl carbonyloxy group, and the like.

In the general formula (Y-1), the aryloxy carbonyloxy group may be a substituted or unsubstituted aryloxy carbonyloxy group having 7 to 30 carbon atoms. Examples of the substituent of the substituted aryloxy carbonyloxy group include the substituents described for the substituted alkyl group. Examples of the aryloxy carbonyloxy group include a phenoxy carbonyloxy group, a p-methoxyphenoxy carbonyloxy group, a p-n-hexadecyloxy phenoxy carbonyloxy group, and the like.

In the general formula (Y-1), the amino group may be a substituted or unsubstituted alkylamino group having 1 to 30 carbon atoms, or a substituted or unsubstituted arylamino group having 6 to 30 carbon atoms. Examples of the substituents of the substituted alkylamino group and the substituted arylamino group include the substituents described for the substituted alkyl group. Examples of the amino group include an amino group, a methylamino group, a dimethylamino group, an anilino group, an N-methyl-anilino group, a diphenyl amino group, a hydroxyethylamino group, a carboxyethylamino group, a sulfoethylamino group, a 3,5-dicarboxy anilino group, and the like.

In the general formula (Y-1), the acylamino group may be a formyl amino group, a substituted or unsubstituted alkyl carbonyl amino group having 1 to 30 carbon atoms, or a substituted or unsubstituted aryl carbonyl amino group having 6 to 30 carbon atoms. Examples of the substituents of the substituted alkyl carbonyl amino group and the substituted aryl carbonyl amino group include the substituents described for the substituted alkyl group. Examples of the acylamino group include a formylamino group, an acetylamino group, a pivaloylamino group, a lauroylamino group, a benzoylamino group, a 3,4,5-tri-n-octyloxyphenyl carbonyl amino group, and the like.

In the general formula (Y-1), the amino carbonyl amino group may be a substituted or unsubstituted amino carbonyl amino group having 1 to 30 carbon atoms. Examples of the substituent of the substituted amino carbonyl amino group include the substituents described for the substituted alkyl group. Examples of the amino carbonyl amino group include a carbamoylamino group, an N,N-dimethylamino carbonyl amino group, an N,N-diethylamino carbonyl amino group, a morpholino carbonyl amino group, and the like.

In the general formula (Y-1), the alkoxy carbonyl amino group may be a substituted or unsubstituted alkoxy carbonyl amino group having 2 to 30 carbon atoms. Examples of the substituent of the substituted alkoxy carbonyl amino group include the substituents described for the substituted alkyl group. Examples of the alkoxy carbonyl amino group include a methoxy carbonyl amino group, an ethoxy carbonyl amino group, a tert-butoxy carbonyl amino group, a n-octadecyloxy carbonyl amino group, an N-methyl-methoxy carbonyl amino group, and the like.

In the general formula (Y-1), the aryloxy carbonyl amino group may be a substituted or unsubstituted aryloxy carbonyl amino group having 7 to 30 carbon atoms. Examples of the substituent of the substituted aryloxy carbonyl amino group include the substituents described for the substituted alkyl group. Examples of the aryloxy carbonyl amino group include a phenoxy carbonyl amino group, a p-chlorophenoxy carbonyl amino group, a m-n-octyloxy phenoxy carbonyl amino group, and the like.

In the general formula (Y-1), the sulfamoyl amino group may be a substituted or unsubstituted sulfamoyl amino group having 0 to 30 carbon atoms. Examples of the substituent of the substituted sulfamoyl amino group include the substituents described for the substituted alkyl group.

Examples of the sulfamoyl amino group include a sulfamoyl amino group, an N,N-dimethylamino sulfonyl amino group, an N-n-octylamino sulfonylamino group, and the like.

In the general formula (Y-1), the alkyl sulfonyl amino group may be a substituted or unsubstituted alkyl sulfonyl amino group having 1 to 30 carbon atoms. Examples of the substituent of the substituted alkyl sulfonyl amino group include the substituents described for the substituted alkyl group. Examples of the alkyl sulfonyl amino group include a methyl sulfonyl amino group, a butyl sulfonyl amino group, and the like.

In the general formula (Y-1), the aryl sulfonyl amino group may be a substituted or unsubstituted aryl sulfonyl amino group having 6 to 30 carbon atoms. Examples of the substituent of the substituted aryl sulfonyl amino group include the substituents described for the substituted alkyl group. Examples of the aryl sulfonyl amino group include a phenyl sulfonyl amino group, a 2,3,5-trichlorophenyl sulfonyl amino group, a p-methyl phenyl sulfonyl amino group, and the like.

In the general formula (Y-1), the alkyl thio group may be a substituted or unsubstituted alkyl thio group having 1 to 30 carbon atoms. Examples of the substituent of the substituted alkyl thio group include the substituents described for the substituted alkyl group. Examples of the alkyl thio group include a methyl thio group, an ethyl thio group, a n-hexadecyl thio group, and the like.

In the general formula (Y-1), the aryl thio group may be a substituted or unsubstituted aryl thio group having 6 to 30 carbon atoms. Examples of the substituent of the substituted aryl thio group include the substituents described for the substituted alkyl group. Examples of the aryl thio group include a phenyl thio group, a p-chlorophenyl thio group, a m-methoxyphenyl thio group, and the like.

In the general formula (Y-1), the heterocyclic thio group may be a substituted or unsubstituted heterocyclic thio group having 2 to 30 carbon atoms. Examples of the substituent of the substituted heterocyclic thio group include the substituents described for the substituted alkyl group. Examples of the heterocyclic thio group include a 2-benzothiazolyl thio group, a 1-phenyltetrazole-5-yl thio group, and the like.

In the general formula (Y-1), the sulfamoyl group may be a substituted or unsubstituted sulfamoyl group having 0 to 30 carbon atoms. Examples of the substituent of the substituted sulfamoyl group include the substituents described for the substituted alkyl group. Examples of the sulfamoyl group include an N-ethyl sulfamoyl group, an N-(3-dodecyloxy propyl)sulfamoyl group, an N,N-dimethyl sulfamoyl group, an N-acetyl sulfamoyl group, an N-benzoyl sulfamoyl group, an N—(N'-phenyl carbamoyl)sulfamoyl group, and the like.

In the general formula (Y-1), the alkyl sulfinyl group may be a substituted or unsubstituted alkyl sulfinyl group having 1 to 30 carbon atoms. Examples of the substituent of the substituted alkyl sulfinyl group include the substituents described for the substituted alkyl group. Examples of the alkyl sulfinyl group include a methyl sulfinyl group, an ethyl sulfinyl group, and the like.

In the general formula (Y-1), the aryl sulfinyl group may be a substituted or unsubstituted aryl sulfinyl group having 6 to 30 carbon atoms. Examples of the substituent of the substituted aryl sulfinyl group include the substituents described for the substituted alkyl group. Examples of the aryl sulfinyl group include a phenyl sulfinyl group, a p-methyl sulfinyl group, and the like.

In the general formula (Y-1), the alkyl sulfonyl group may be a substituted or unsubstituted alkyl sulfonyl group having 1 to 30 carbon atoms. Examples of the substituent of the substituted alkyl sulfonyl group include the substituents described for the substituted alkyl group. Examples of the alkyl sulfonyl group include a methyl sulfonyl group, an ethyl sulfonyl group, and the like.

In the general formula (Y-1), the aryl sulfonyl group may be a substituted or unsubstituted aryl sulfonyl group having 6 to 30 carbon atoms. Examples of the substituent of the substituted aryl sulfonyl group include the substituents described for the substituted alkyl group. Examples of the aryl sulfonyl group include a phenyl sulfonyl group, a p-toluene sulfonyl group, and the like.

In the general formula (Y-1), the acyl group may be a formyl group, a substituted or unsubstituted alkyl carbonyl group having 2 to 30 carbon atoms, a substituted or unsubstituted aryl carbonyl group having 7 to 30 carbon atoms, or a substituted or unsubstituted heterocyclic carbonyl group having 4 to 30 carbon atoms, bound to a carbonyl group through a carbon atom. Examples of the substituents of the substituted alkyl carbonyl group, the substituted aryl carbonyl group, and the substituted heterocyclic carbonyl group include the substituents described for the substituted alkyl group. Examples of the acyl group include an acetyl group, a pivaloyl group, a 2-chloroacetyl group, a stearoyl group, a benzoyl group, a p-n-octyloxy phenyl carbonyl group, a 2-pyridyl carbonyl group, a 2-furyl carbonyl group, and the like.

In the general formula (Y-1), the aryloxy carbonyl group may be a substituted or unsubstituted aryloxy carbonyl group having 7 to 30 carbon atoms. Examples of the substituent of the substituted aryloxy carbonyl group include the substituents described for the substituted alkyl group. Examples of the aryloxy carbonyl group include a phenoxy carbonyl group, an o-chlorophenoxy carbonyl group, a m-nitrophenoxy carbonyl group, a p-tert-butyl phenoxy carbonyl group, and the like.

In the general formula (Y-1), the alkoxy carbonyl group may be a substituted or unsubstituted alkoxy carbonyl group having 2 to 30 carbon atoms. Examples of the substituent of the substituted alkoxy carbonyl group include the substituents described for the substituted alkyl group. Examples of the alkoxy carbonyl group include a methoxy carbonyl group, an ethoxy carbonyl group, a tert-butoxy carbonyl group, a n-octadecyloxy carbonyl group, and the like.

In the general formula (Y-1), the carbamoyl group may be a substituted or unsubstituted carbamoyl group having 1 to 30 carbon atoms. Examples of the substituent of the substituted carbamoyl group include the substituents described for the substituted alkyl group. Examples of the carbamoyl group include a carbamoyl group, an N-methyl carbamoyl group, an N,N-dimethyl carbamoyl group, an N,N-di-n-octyl carbamoyl group, an N-(methylsulfonyl)carbamoyl group, and the like.

In the general formula (Y-1), the phosphino group may be a substituted or unsubstituted phosphino group having 2 to 30 carbon atoms. Examples of the substituent of the substituted phosphino group include the substituents described for the substituted alkyl group. Examples of the phosphino group include a dimethyl phosphino group, a diphenyl phosphino group, a methyl phenoxy phosphino group, and the like.

In the general formula (Y-1), the phosphinyl group may be a substituted or unsubstituted phosphinyl group having 2 to 30 carbon atoms. Examples of the substituent of the substituted phosphinyl group include the substituents described for the substituted alkyl group. Examples of the phosphinyl group include a phosphinyl group, a dioctyloxy phosphinyl group, a diethoxy phosphinyl group, and the like.

In the general formula (Y-1), the phosphinyloxy group may be a substituted or unsubstituted phosphinyloxy group having 2 to 30 carbon atoms. Examples of the substituent of the substituted phosphinyloxy group include the substituents described for the substituted alkyl group. Examples of the phosphinyloxy group include a diphenoxy phosphinyloxy group, a dioctyloxy phosphinyloxy group, and the like.

In the general formula (Y-1), the phosphinyl amino group may be a substituted or unsubstituted phosphinyl amino group having 2 to 30 carbon atoms. Examples of the substituent of the substituted phosphinyl amino group include the substituents described for the substituted alkyl group. Examples of the phosphinyl amino group include a dimethoxy phosphinyl amino group, a dimethylamino phosphinyl amino group, and the like.

In the general formula (Y-1), the silyl group may be a substituted or unsubstituted silyl group having 3 to 30 carbon atoms. Examples of the substituent of the substituted silyl group include the substituents described for the substituted alkyl group. Examples of the silyl group include a trimethyl silyl group, a tert-butyldimethyl silyl group, a phenyldimethyl silyl group, and the like.

In the general formula (Y-1), examples of the azo group include a phenyl azo group, a 4-methoxyphenyl azo group, a 4-pivaloylamino phenyl azo group, a 2-hydroxy-4-propanoyl phenyl azo group, and the like.

In the general formula (Y-1), examples of the imide group include an N-succinimide group, an N-phthalimide group, and the like.

In the general formula (Y-1), $X_1$ and $X_2$ each represent an electron attractive group, and may be identical to or different from each other. Examples of the $X_1$ and $X_2$ include an acyl group, an acyloxy group, a carbamoyl group, an alkoxy carbonyl group, an aryloxy carbonyl group, a cyano group, a nitro group, a dialkyl phosphono group, a diaryl phosphono group, a diaryl phosphinyl group, an alkyl sulfinyl group, an aryl sulfinyl group, an alkyl sulfonyl group, an aryl sulfonyl group, a sulfonyloxy group, an acyl thio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with another electron attractive group, a heterocyclic group, a halogen atom, an azo group, a selenocyanate group, and the like.

In the general formula (Y-1), $X_1$ and $X_2$ each may be an acyl group having 2 to 12 carbon atoms, an acyloxy group having 2 to 12 carbon atoms, a carbamoyl group having 1 to 12 carbon atoms, an alkoxy carbonyl group having 2 to 12 carbon atoms, an aryloxy carbonyl group having 7 to 18 carbon atoms, a cyano group, a nitro group, an alkyl sulfinyl group having 1 to 12 carbon atoms, an aryl sulfinyl group having 6 to 18 carbon atoms, an alkyl sulfonyl group having 1 to 12 carbon atoms, an aryl sulfonyl group having 6 to 18 carbon atoms, a sulfamoyl group having 0 to 12 carbon atoms, a halogenated alkyl group having 1 to 12 carbon atoms, a halogenated alkoxy group having 1 to 12 carbon atoms, a halogenated alkylthio group having 1 to 12 carbon atoms, a halogenated aryloxy group having 7 to 18 carbon atoms, an aryl group having 7 to 18 carbon atoms, substituted with two or more electron attractive groups other than the aryl group, or a 5- to 8-membered heterocyclic group having 1 to 18 carbon atoms and having a nitrogen atom, an oxygen atom, or a sulfur atom.

In the general formula (Y-1), $Z_1$ and $Z_2$ each represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and may be identical to or different from each other. Examples of the alkyl group, the alkenyl group, the alkynyl group, the aralkyl group, the aryl group, and the heterocyclic group are the same as those described for $R_1$, $R_2$, $Y_1$, and $Y_2$.

In the general formula (Y-1), $M_1$ represents a hydrogen atom or a cation. The cation is an alkali metal ion, an ammonium ion, or a quaternary ammonium ion. The cation may be Li, Na, K, $NH_4$, or $NR_4$. R represents an alkyl group or an aryl group, and examples thereof are the same as those described for $R_1$, $R_2$, $Y_1$, and $Y_2$. Out of these, the cation may be Li, Na, K, or $NH_4$.

As for the combination of the substituents of the dye represented by the general formula (Y-1), at least one of various substituents may be the aforementioned group. Further, a larger number of various substituents may be the aforementioned groups. Moreover, all the substituents may be the aforementioned groups.

The combinations of the substituents of the dye represented by the general formula (Y-1) include the following (I) to (V).

(I) $R_1$ and $R_2$ may be identical to or different from each other, and may be a substituted or unsubstituted alkyl group having 1 to 12 carbon atoms in total, a substituted or unsubstituted aryl group having 6 to 18 carbon atoms in total, or a substituted or unsubstituted heterocyclic group having 4 to 12 carbon atoms in total. Out of these, $R_1$ and $R_2$ may be a straight chain or branched alkyl group having 1 to 8 carbon atoms, a secondary or tertiary alkyl group, or a tert-butyl group.

(II) $X_1$ and $X_2$, each represent an electron attractive group, and may be identical to or different from each other. $X_1$ and $X_2$ may be a cyano group, an alkyl sulfonyl group having 1 to 12 carbon atoms, an aryl sulfonyl group having 6 to 18 carbon atoms, or a sulfamoyl group having 0 to 12 carbon atoms. Out of these, $X_1$ and $X_2$ may be a cyano group or an alkyl sulfonyl group having 1 to 12 carbon atoms.

(III) $Y_1$ and $Y_2$ may be identical to or different from each other, and may be a hydrogen atom, a substituted or unsubstituted alkyl group having 1 to 12 carbon atoms in total, a substituted or unsubstituted aryl group having 6 to 18 carbon atoms in total, or a substituted or unsubstituted heterocyclic group having 4 to 12 carbon atoms in total. $Y_1$ and $Y_2$ may be a hydrogen atom or a substituted or unsubstituted alkyl group. Out of these, $Y_1$ and $Y_2$ may be a hydrogen atom.

(IV) $Z_1$ and $Z_2$ may be identical to or different from each other, and may be a substituted or unsubstituted alkyl group having 1 to 12 carbon atoms in total, a substituted or unsubstituted aryl group having 6 to 18 carbon atoms in total, or a substituted or unsubstituted heterocyclic group having 4 to 12 carbon atoms in total. $Z_1$ and $Z_2$ may be a substituted or unsubstituted aryl group or a substituted or unsubstituted heterocyclic group. Out of these, $Z_1$ and $Z_2$ may be a substituted aryl group.

(V) $M_1$ may be a hydrogen atom, an alkali metal ion, an ammonium ion, or a quaternary ammonium ion. Out of these, M may be a hydrogen atom, Li, Na, K, or $NH_4$.

Examples of the dye (Y-1) include compounds represented by the following chemical formulae (Y-1a) to (Y-1e).

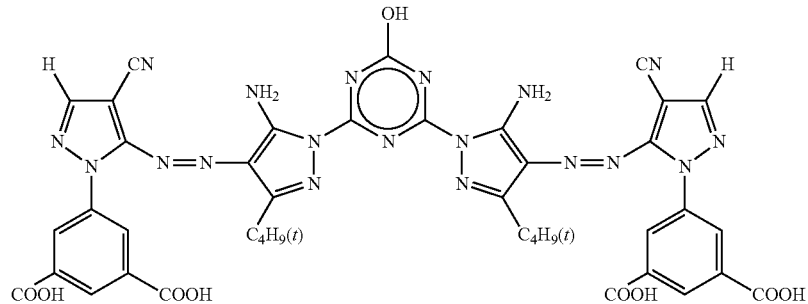

(Y-1a)

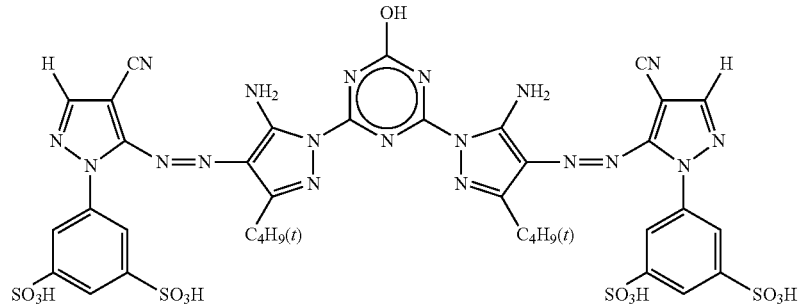

(Y-1b)

-continued

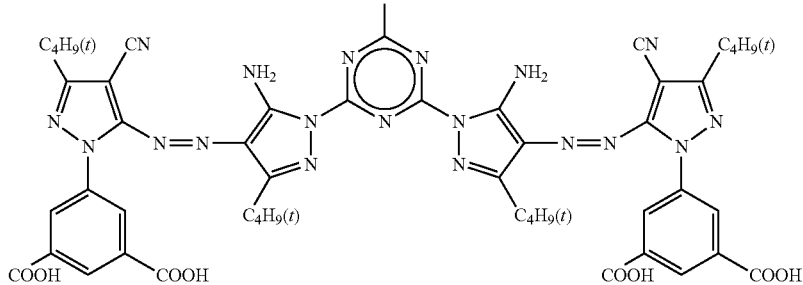
(Y-1c)

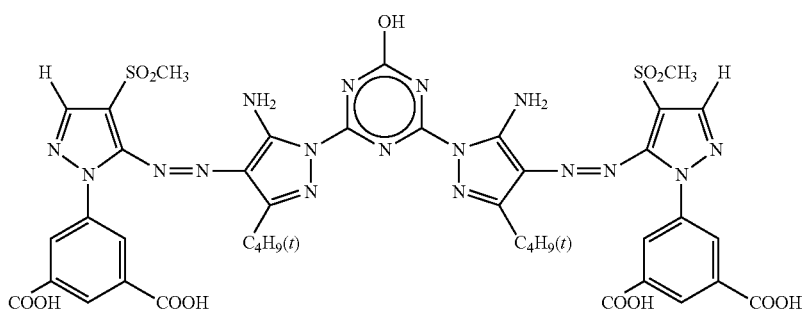
(Y-1d)

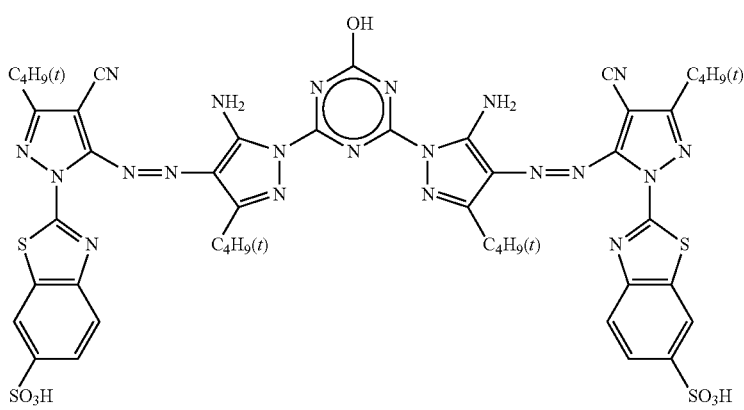
(Y-1e)

The amount of the yellow dye (Y-1) to be added is not particularly limited. By containing the yellow dye (Y-1) in the water-based yellow ink, ozone resistance and light resistance may be improved. The amount of the yellow dye (Y-1) to be added is, for example, in the range of about 0.1 wt % to about 10 wt %, about 1.2 wt % to about 5.4 wt %, and about 1.5 wt % to about 4.5 wt % with respect to the amount of the water-based yellow ink.

As mentioned above, the yellow dye (Y-2) is at least one dye selected from the group consisting of C. I. Direct Yellow 86, C. I. Direct Yellow 132, and C. I. Direct Yellow 142.

C. I. Direct Yellow 86 is a dye represented by the structural formula (Y-2a).

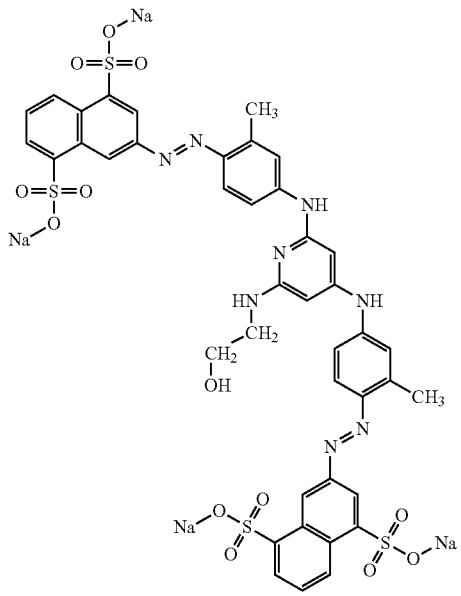

C. I. Direct Yellow 132 is a dye represented by the structural formula (Y-2b).

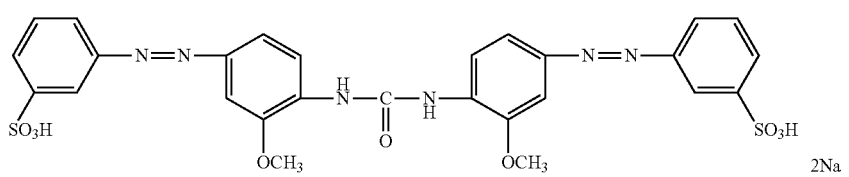

C. I. Direct Yellow 142 is a dye represented by a structural formula (Y-2c).

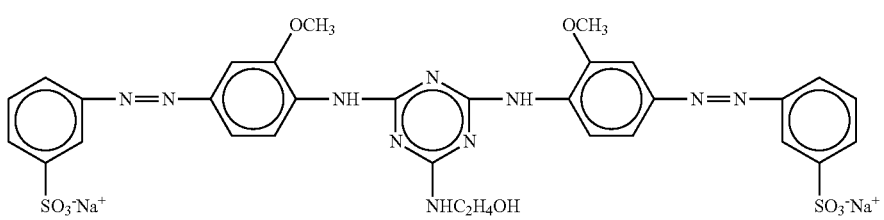

The amount of the yellow dye (Y-2) to be added is not particularly limited. By containing the yellow dye (Y-2) in the water-based yellow ink, storing stability may be improved. The amount of the yellow dye (Y-2) to be added is, for example, in the range of about 0.1 wt % to about 10 wt %, about 0.2 wt % to about 2.4 wt %, and about 0.4 wt % to about 1.6 wt % with respect to the amount of the water-based yellow ink.

The weight ratio of the yellow dye (Y-1) to the yellow dye (Y-2) in the water-based yellow ink may be in the range of about 50:50 to about 95:5, and about 60:40 to about 90:10 (yellow dye (Y-1): yellow dye (Y-2)). By setting the weight ratio to be in the aforementioned range, a water-based yellow ink with excellent storing stability, ozone resistance, and light resistance may be obtained.

The total amount of the yellow dye (Y-1) and the yellow dye (Y-2) to be added is not particularly limited, and may be in the range of about 2 wt % to about 6 wt % with respect to the amount of the water-based yellow ink. By setting the total amount to be added to be in the aforementioned range, a water-based yellow ink with excellent storing stability, color developing properties, ozone resistance, light resistance, and ejection stability may be obtained.

The yellow coloring agent may further contain other dyes and pigments besides the yellow dye (Y-1) and the yellow dye (Y-2).

The water may be ion-exchange water or purified water. The amount of the water to be added (the proportion of the water in the water-based yellow ink) with respect to the amount of the water-based yellow ink is, for example, in the range of about 10 wt % to about 90 wt %, and about 40 wt % to about 80 wt %. The proportion of the water in the water-based yellow ink may be a balance of the other components, for example.

Examples of the water-soluble organic solvent include a humectant and a penetrant. The humectant prevents a water-based yellow ink from drying at a nozzle tip portion of an ink-jet head, for example. The penetrant adjusts a drying rate of a water-based ink on a recording medium, for example.

The humectant is not particularly limited, and examples thereof include lower alcohols such as methyl alcohol, ethyl alcohol, n-propyl alcohol, isopropyl alcohol, n-butyl alcohol, sec-butyl alcohol, tert-butyl alcohol, and the like; amides such as dimethylformamide, dimethylacetamide, and the like; ketones such as acetone and the like; ketoalcohols such as diacetone alcohol and the like; ethers such as tetrahydrofuran, dioxane, and the like; polyalcohols such as polyalkylene glycol, alkylene glycol, glycerin, and the like; 2-pyrrolidone; N-methyl-2-pyrrolidone; 1,3-dimethyl-2-imidazolidinone; and the like. Examples of the polyalkylene glycol include polyethylene glycol, polypropylene glycol, and the like. Examples of the alkylene glycol include ethylene glycol, propylene glycol, butylene glycol, diethylene glycol, triethylene glycol, dipropylene glycol, tripropylene glycol, thiodiglycol, hexylene glycol, and the like. These humectants may be used alone or in a combination of two or more of them. Out of these, the humectant may be polyalcohol such as alkylene glycol, glycerin, or the like.

The amount of the humectant to be added with respect to the amount of the water-based yellow ink is not particularly limited, and is, for example, in the range of 0 wt % to about 95 wt %, about 5 wt % to about 80 wt %, and about 5 wt % to about 50 wt %.

Examples of the penetrant include glycol ethers. Examples thereof include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, and the like. The penetrants may be used alone or in a combination of two or more of them.

The amount of the penetrant to be added with respect to the amount of the water-based yellow ink is, for example, in the range of 0 wt % to about 20 wt %, about 0.1 wt % to about 15 wt %, and about 0.5 wt % to about 10 wt %.

The water-based yellow ink may further contain a conventionally known additive as required. Examples of the additive include a surfactant, a pH adjuster, a viscosity modifier, a surface tension modifier, a mildew proofing agent, and the like. Examples of the viscosity modifier include polyvinyl alcohol, cellulose, a water-soluble resin, and the like.

The water-based yellow ink may be prepared by uniformly mixing a yellow coloring agent, water, a water-soluble organic solvent with other addition components as required by a conventionally known method, and then removing sediments with a filter, for example.

(Water-Based Magenta Ink)

The water-based magenta ink will be described. As mentioned above, the water-based magenta ink contains a magenta coloring agent, water, and a water-soluble organic solvent. The magenta coloring agent contains the magenta dye (M-1) and the magenta dye (M-2).

As mentioned above, the magenta dye (M-1) is a dye represented by the general formula (M-1).

A compound represented by the general formula (M-1) may be a compound in which all of the three Ms are sodium (sodium salts), a compound in which all of the three Ms are ammonium (ammonium salts), or a compound in which one or two of the three Ms are sodium and the other(s) is(are) ammonium. The magenta dye (M-1) may be composed of one of the aforementioned compounds or may be a mixture containing two or more of the aforementioned compounds. M may be ionized in a water-based magenta ink (may become at least one of $Na^+$ and $NH_4^+$).

Examples of the magenta dye (M-1) include compounds represented by the magenta dyes (M-1a) to (M-1e) that are summarized in Table 1.

TABLE 1

|  | $n_1$ | M | $R_0$ |
|---|---|---|---|
| Magenta dye (M-1a) | 1 | Mixture of Na and $NH_4$ | —$NHCH_2COOH$ |
| Magenta dye (M-1b) | 1 | Mixture of Na and $NH_4$ | —$NH(CH_2)_5COOH$ |
| Magenta dye (M-1c) | 1 | Mixture of Na and $NH_4$ | —$NH(CH_2)_7COOH$ |
| Magenta dye (M-1d) | 2 | Mixture of Na and $NH_4$ | —$NHCH_2COOH$ |
| Magenta dye (M-1e) | 2 | Mixture of Na and $NH_4$ | —$NH(CH_2)_5COOH$ |

As mentioned above, the magenta dye (M-2) is at least one dye selected from the group consisting of dyes represented by the general formula (M-2a), dyes represented by the general formula (M-2b), C. I. Acid Red 1, and C. I. Acid Red 254.

In the general formula (M-2a), the substituted or unsubstituted alkyl group may be an alkyl group having 1 to 6 carbon atoms. Examples of the substituted or unsubstituted alkyl group include a methyl group, an ethyl group, a n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, and the like. Examples of a substituent of the substituted alkyl group include a hydroxyl group; an alkoxy group such as a methoxy group, an ethoxy group, or the like; a cyano group; a halogen atom such as a fluorine atom, a chlorine atom, a bromine atom, an iodine atom, or the like; an ionic hydrophilic group such as a carboxylate, a sulfonate, or the like; and the like.

In the general formula (M-2a), the substituted or unsubstituted aryl group may be an aryl group having 6 to 12 carbon atoms. However, in the case of the substituted aryl group, the number of carbon atoms does not include the number of carbon atoms of its substituent(s). Examples of the substituted or unsubstituted aryl group include a phenyl group, a naphthyl group, a p-tolyl group, a p-octylphenyl group, a mesityl group, a p-methoxyphenyl group, an o-chlorophenyl group, a m-(3-sulfopropylamino)phenyl group, and the like. Examples of the substituent of the substituted aryl group include an alkyl group such as a methyl group, an ethyl group, an isopropyl group, a tert-butyl group, a n-octyl group, or the like; the same alkoxy group as described above; the same halogen atom as described above; an alkylamino group such as a methylamino group, a dimethylamino group, or the like; an amide group; a carbamoyl group; a sulfamoyl group; a sulfoamide group; a hydroxyl group; an ester group such as a methoxycarbonyl group, an ethoxycarbonyl group, or the like; the same ionic hydrophilic group as described above; and the like.

In the general formula (M-2a), examples of the halogen atom include a fluorine atom, a chlorine atom, a bromine atom, an iodine atom, and the like.

In the general formula (M-2a), the substituted or unsubstituted heterocyclic group may be a 5- or 6-membered heterocyclic group. Examples of the substituted or unsubstituted heterocyclic group include a 2-pyridyl group, a 2-thienyl group, a 2-thiazolyl group, a 2-benzothiazolyl group, a 2-furyl group, a 6-sulfobenzothiazolyl group, a 6-sulfonate benzothiazolyl group, and the like. Examples of the substituent of the substituted heterocyclic group include an amide group, a carbamoyl group, a sulfamoyl group, a sulfoamide group, a hydroxyl group, the same ester group as described above, the same ionic hydrophilic group as described above, and the like.

In the general formula (M-2a), examples of the substituted or unsubstituted sulfonyl group include a methylsulfonyl group, a phenylsulfonyl group, and the like. Examples of the substituent of the substituted sulfonyl group include the same substituted or unsubstituted alkyl group as described above, the same substituted or unsubstituted aryl group as described above, and the like.

In the general formula (M-2a), the substituted or unsubstituted acyl group may be an acyl group having 1 to 12 carbon atoms. However, in the case of the substituted acyl group, the number of carbon atoms does not include the number of carbon atoms of its substituent(s). Examples of the substituted or unsubstituted acyl group include an acetyl group, a benzoyl group, a chloroacetyl group, and the like. Examples of the substituent of the substituted acyl group include the same ionic hydrophilic group as described above and the like.

As described above, in the general formula (M-2a), $A_1$ and $A_2$ are both substituted or unsubstituted carbon atoms, or one of $A_1$ and $A_2$ is a substituted or unsubstituted carbon atom and the other is a nitrogen atom. When $A_1$ and $A_2$ are both carbon atoms, better performance may be obtained. Examples of the substituent bonded to the carbon atoms $A_1$ and $A_2$ include an alkyl group having 1 to 3 carbon atoms, a carboxyl group, a carbamoyl group, a cyano group, and the like.

As described above, in the general formula (M-2a), $R_{14}$ and $R_{15}$ are not both hydrogen atoms and $R_{16}$ and $R_{17}$ are not both hydrogen atoms. Moreover, in the general formula (M-2a), the water solubility of the dye tends to be improved as the number of substitutions by a sulfonic acid group or a carboxyl group is increased. Therefore, the number of these substitutions may be adjusted in accordance with need.

One embodiment of the magenta dye (M-2a) is an embodiment where, for example, in the general formula (M-2a), $R_{11}$ is an alkyl group; $R_{12}$ is a cyano group; $R_{13}$ is a hydrogen atom or a substituted or unsubstituted heterocyclic group; $R_{14}$ is a hydrogen atom, a substituted or unsubstituted heterocyclic group or a substituted aryl group; $R_{15}$ and $R_{16}$ each are a substituted heterocyclic group or a substituted aryl group; $R_{17}$ is a hydrogen atom; $A_1$ is a substituted carbon atom; and $A_2$ is a substituted or unsubstituted carbon atom.

Another embodiment of the magenta dye (M-2a) is an embodiment where, for example, in the general formula (M-2a), $R_{11}$ is a tert-butyl group; $R_{12}$ is a cyano group; $R_{13}$ is a hydrogen atom or a benzothiazolyl group (for example, a benzothiazole-2-yl group) optionally substituted by a sulfonic acid group or an alkali metal sulfonate group; $R_{14}$ is a hydrogen atom, a benzothiazolyl group (for example, a benzothiazole-2-yl group) optionally substituted by a sulfonic acid group or an alkali metal sulfonate group, or a trialkylphenyl group (for example, a mesityl group) substituted by a sulfonic acid group or an alkali metal sulfonate group; $R_{15}$ and $R_{16}$ each are a monoalkylphenyl group, a dialkylphenyl group, or a trialkylphenyl group (for example, a p-octylphenyl group or a mesityl group) optionally substituted by a sulfonic acid group or an alkali metal sulfonate group or a benzothiazolyl group (for example, a benzothiazole-2-yl group) substituted by a sulfonic acid group or an alkali metal sulfonate group; $R_{17}$ is a hydrogen atom; $A_1$ is a substituted carbon atom; and $A_2$ is a carbon atom optionally substituted by a cyano group.

Examples of the magenta dye (M-2a) include compounds represented by the chemical formulae (M-2a-1) to (M-2a-6).

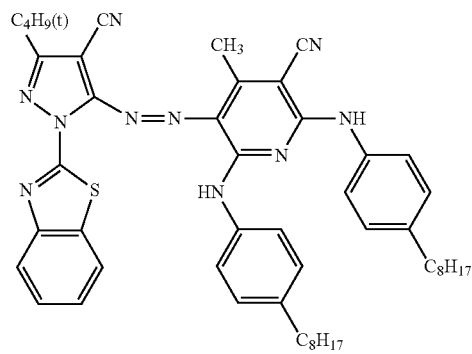

(M-2a-1)

The compound represented by the chemical formula (M-2a-1) is an embodiment, where in the general formula (M-2a), $R_{11}$ is a tert-butyl group; $R_{12}$ is a cyano group; $R_{13}$ is a benzothiazole-2-yl group; $R_{14}$ is a hydrogen atom; $R_{15}$ and $R_{16}$ each are a p-octylphenyl group; $R_{17}$ is a hydrogen atom; $A_1$ is a carbon atom substituted by a methyl group; and $A_2$ is a carbon atom substituted by a cyano group.

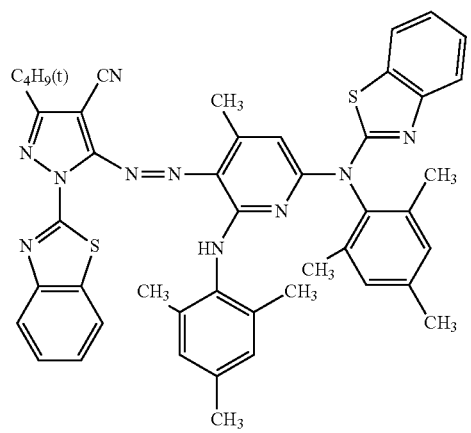

(M-2a-2)

The compound represented by the chemical formula (M-2a-2) is another embodiment, where in the general formula (M-2a), $R_{11}$ is a tert-butyl group; $R_{12}$ is a cyano group; $R_{13}$ and $R_{14}$ each are a benzothiazole-2-yl group; $R_{15}$ and $R_{16}$ each are a mesityl group; $R_{17}$ is a hydrogen atom; $A_1$ is a carbon atom substituted by a methyl group; and $A_2$ is a carbon atom.

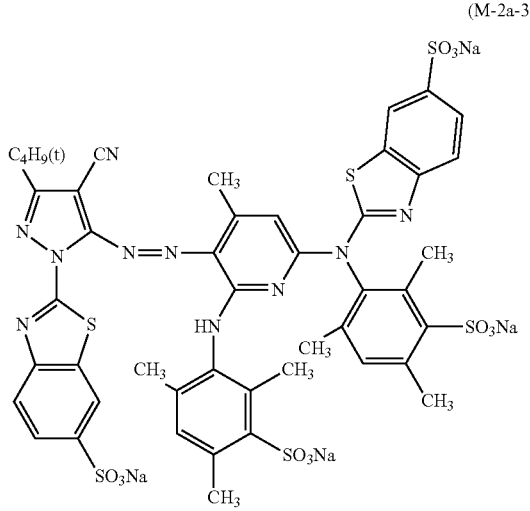

(M-2a-3)

The compound represented by the chemical formula (M-2a-3) is still another embodiment, where in the general formula (M-2a), $R_{11}$ is a tert-butyl group; $R_{12}$ is a cyano group; $R_{13}$ and $R_{14}$ each are a 6-sodium sulfonate benzothiazole-2-yl group; $R_{15}$ and $R_{16}$ each are a 3-sodium sulfonate mesityl group; $R_{17}$ is a hydrogen atom; $A_1$ is a carbon atom substituted by a methyl group; and $A_2$ is a carbon atom.

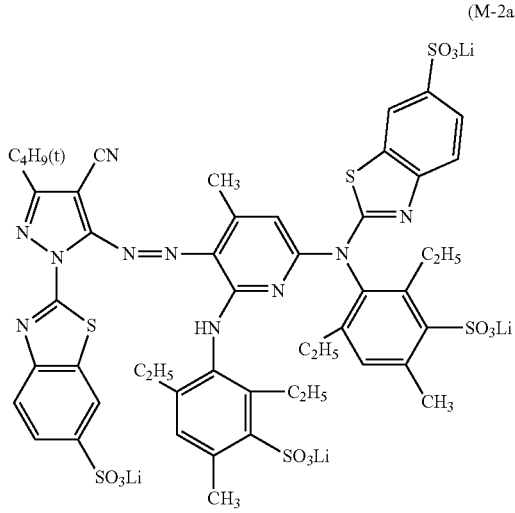

(M-2a-4)

The compound represented by the chemical formula (M-2a-4) is yet another embodiment, where in the general formula (M-2a), $R_{11}$ is a tert-butyl group; $R_{12}$ is a cyano group; $R_{13}$ and $R_{14}$ each are a 6-lithium sulfonate benzothiazole-2-yl group; $R_{15}$ and $R_{16}$ each are a 2,6-diethyl-4-methyl-3-lithium sulfonate phenyl group, $R_{17}$ is a hydrogen atom; $A_1$ is a carbon atom substituted by a methyl group; and $A_2$ is a carbon atom.

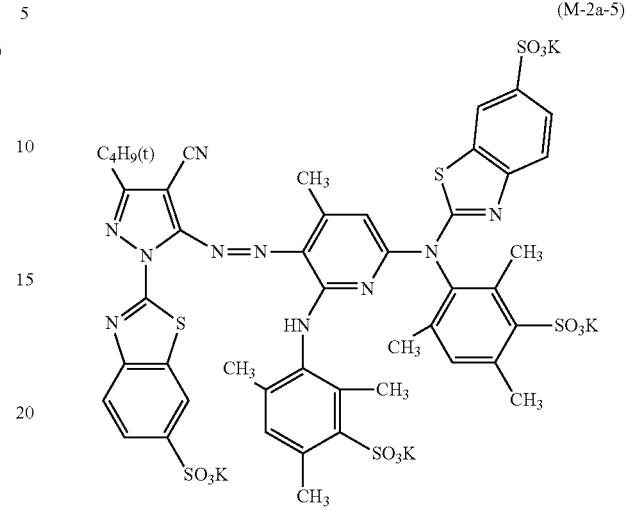

(M-2a-5)

The compound represented by the chemical formula (M-2a-5) is yet another embodiment, where in the general formula (M-2a), $R_{11}$ is a tert-butyl group; $R_{12}$ is a cyano group; $R_{13}$ and $R_{14}$ each are a 6-potassium sulfonate benzothiazole-2-yl group; $R_{15}$ and $R_{16}$ each are a 3-potassium sulfonate mesityl group; $R_{17}$ is a hydrogen atom; $A_1$ is a carbon atom substituted by a methyl group; and $A_2$ is a carbon atom.

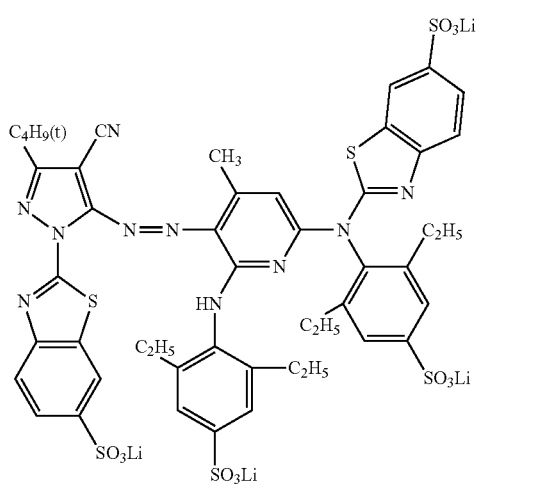

(M-2a-6)

The compound represented by the chemical formula (M-2a-6) is yet another embodiment, where in the general formula (M-2a), $R_{11}$ is a tert-butyl group; $R_{12}$ is a cyano group; $R_{13}$ and $R_{14}$ each are a 6-lithium sulfonate benzothiazole-2-yl group; $R_{15}$ and $R_{16}$ each are a 2,6-diethyl-4-lithium sulfonate phenyl group; $R_{17}$ is a hydrogen atom; $A_1$ is a carbon atom substituted by a methyl group; and $A_2$ is a carbon atom.

In the case where the magenta dye (M-2) is the magenta dye (M-2a), by containing the magenta dye (M-1) in the water-based magenta ink, ozone resistance, light resistance, and ejection stability may be improved. In this case, the amount of the magenta dye (M-1) to be added is not particularly limited, and is, for example, in the range of about 0.1 wt % to about 10 wt %, about 0.4 wt % to about 3.6 wt %, and about 0.8 wt % to about 3 wt % with respect to the amount of the water-based magenta ink.

In the case where the magenta dye (M-2) is the magenta dye (M-2a), by containing the magenta dye (M-2) in the water-based magenta ink, color developing properties, ozone resistance, and light resistance may be improved. In this case, the amount of the magenta dye (M-2) to be added is not particularly limited, and is, for example, in the range of about 0.1 wt % to about 10 wt %, about 0.8 wt % to about 4.8 wt %, and about 1.0 wt % to about 3.2 wt % with respect to the amount of the water-based magenta ink.

In the case where the magenta dye (M-2) is the magenta dye (M-2a), the weight ratio of the magenta dye (M-1) to the magenta dye (M-2) in the water-based magenta ink may be in the range of about 60:40 to about 20:80 (magenta dye (M-1): magenta dye (M-2)). By setting the weight ratio to be in the aforementioned range, a water-based magenta ink with excellent color developing properties and ejection stability may be obtained.

In the general formula (M-2b), the substituted or unsubstituted alkyl group of $R_{18}$, $R_{19}$, and $R_{20}$ may be an alkyl group having 1 to 9 carbon atoms in total. Examples of the substituted or unsubstituted alkyl group include a methyl group, an ethyl group, a n-propyl group, an isopropyl group, a n-butyl group, a trifluoromethyl group, a dimethylaminomethyl group, and the like. Examples of the substituent of the substituted alkyl group include a hydroxyl group; an alkoxy group such as a methoxy group, an ethoxy group, or the like; a cyano group; a halogen atom such as a fluorine atom, a chlorine atom, a bromine atom, an iodine atom, or the like; an ionic hydrophilic group such as a carboxylate, a sulfonate, or the like; and the like.

In the general formula (M-2b), the substituted or unsubstituted alkoxy group of $R_{18}$, $R_{19}$, and $R_{20}$ may be an alkoxy group having 1 to 9 carbon atoms in total. Examples of the substituted or unsubstituted alkoxy group include a methoxy group, an isopropoxy group, a n-butoxy group, and the like.

In the general formula (M-2b), examples of the halogen atom of $R_{18}$, $R_{19}$, and $R_{20}$ include a fluorine atom, a chlorine atom, a bromine atom, an iodine atom, and the like.

In the general formula (M-2b), examples of the substituted or unsubstituted carbamoyl group of $R_{18}$, $R_{19}$, and $R_{20}$ include a carbamoyl group, an N,N-dimethylcarbamoyl group, a phenylcarbamoyl group, and the like.

In the general formula (M-2b), examples of the substituted or unsubstituted sulfamoyl group of $R_{18}$, $R_{19}$, and $R_{20}$ include a sulfamoyl group, an N-methylsulfamoyl group, an N-ethylsulfamoyl group, an N-ethyl-N-phenylsulfamoyl group, an N,N-dimethylsulfamoyl group, a p-carboxyphenylsulfamoyl group, and the like.

In the general formula (M-2b), examples of the substituted or unsubstituted amino group of $R_{18}$, $R_{19}$, and $R_{20}$ include an N-methylamino group, a carbamoylamino group, an N,N-diethylamino group, an acetylamino group, and the like.

In the general formula (M-2b), examples of the sulfonate ester group of $R_{18}$, $R_{19}$, and $R_{20}$ include a phenoxysulfonyl group and the like.

In the general formula (M-2b), the substituted or unsubstituted alkylsulfonyl group of $R_{18}$, $R_{19}$, and $R_{20}$ may be an alkylsulfonyl group having 1 to 9 carbon atoms in total. Examples of the substituted or unsubstituted alkylsulfonyl group include a hydroxysulfonyl group and the like.

In the general formula (M-2b), the substituted unsubstituted arylsulfonyl group of $R_{18}$, $R_{19}$, and $R_{20}$ may be an arylsulfonyl group having 6 to 15 carbon atoms in total. Examples of the substituted or unsubstituted arylsulfonyl group include a benzylsulfonyl group and the like.

In the general formula (M-2b), examples of the carboxylate ester group in $R_{18}$, $R_{19}$, and $R_{20}$ include a methoxycarbonyl group and the like.

In the general formula (M-2b), the substituted or unsubstituted alkyl group of $R_{21}$, $R_{22}$, and $R_{23}$ may be an alkyl group having 1 to 18 carbon atoms in total. Examples of the substituted or unsubstituted alkyl group include an ethyl group, a n-butyl group, a n-octyl group, an ethylhexyl group, a hydroxyethyl group, a carboxypropyl group, a carboxycyclohexylmethyl group, a 1-carboxy-2-mercaptoethyl group, a 1-carboxy-2-carbamoyl-ethyl group, a 1-isopropyl-1-carboxymethyl group, a 1,2-dicarboxypropyl group, and the like. Examples of the substituent of the substituted alkyl group include a hydroxyl group; an alkoxy group such as a methoxy group, an ethoxy group, or the like; a cyano group; a halogen atom such as a fluorine atom, a chlorine atom, a bromine atom, an iodine atom, or the like; an ionic hydrophilic group such as a carboxylate, a sulfonate, or the like; and the like.

In the general formula (M-2b), the substituted or unsubstituted alkenyl group of $R_{21}$, $R_{22}$, and $R_{23}$ may be an alkenyl group having 2 to 18 carbon atoms in total. Examples of the substituted or unsubstituted alkenyl group include a 2-methyl-1-propenyl group, a vinyl group, an allyl group, and the like.

In the general formula (M-2b), examples of the substituted or unsubstituted aryl group of $R_{21}$, $R_{22}$, and $R_{23}$ include a 3,4-dicarboxyphenyl group, a 4-butylphenyl group, a 4-carboxyphenyl group, and the like. Examples of the substituent of the substituted aryl group include the substituents described for the substituted alkyl group.

In the general formula (M-2b), examples of the substituted or unsubstituted aralkyl group of $R_{21}$, $R_{22}$, and $R_{23}$ include a benzyl group, a 1-carboxy-2-phenyl-ethyl group, a 1-carboxy-2-hydroxyphenylethyl group, a 4-carboxybenzyl group, and the like.

In the general formula (M-2b), examples of the substituted or unsubstituted alicyclic group of $R_{21}$, $R_{22}$, and $R_{23}$ include a cyclohexyl group, a 4-carboxycyclohexyl group, and the like.

In the general formula (M-2b), examples of the substituted or unsubstituted heterocyclic group of $R_{21}$, $R_{22}$, and $R_{23}$ include a pyridyl group, a thiadiazolyl group, a benzothiazolyl group, a 2,2,6,6-tetramethylpiperidinyl group, and the like. Examples of the substituent of the substituted heterocyclic group include the substituents described for the substituted alkyl group.

In the general formula (M-2b), at least one of $R_{21}$, $R_{22}$, and $R_{23}$ may be an alkyl group, an alkenyl group, an aryl group, an alicyclic group, an aralkyl group, or a heterocyclic group substituted by one to four carboxyl groups or sulfamoyl groups.

In the general formula (M-2b), $R_{21}$ and $R_{22}$ may each be a hydrogen atom or a tri-substituted phenyl group, and may be identical to or different from each other. In this instance, three substituents of the tri-substituted phenyl group each are a hydrogen atom, a halogen atom, a hydroxyl group, a substituted or unsubstituted alkyl group having 1 to 9 carbon atoms in total, a substituted or unsubstituted alkoxy group having 1 to 9 carbon atoms in total, a substituted or unsubstituted carbamoyl group, a substituted or unsubstituted sulfamoyl group, a substituted or unsubstituted amino group, a nitro group, a sulfonate ester group, or a carboxylate ester group. The aforementioned three substituents may be identical to or different from each other.

One embodiment of the magenta dye (M-2b) is an embodiment where, for example, in the general formula (M-2b), at least one of $R_{21}$, $R_{22}$, and $R_{23}$ is an alkyl group, an alkenyl group, an aryl group, an aralkyl group, or a cyclohexyl group substituted by one to four carboxyl groups or sulfamoyl groups.

With respect to the magenta dye (M-2b), the number of sulfonic acid groups, carboxyl groups, and/or these salts contained in its structure may be six or less, five or less, and four or less in total. Furthermore, the magenta dye (M-2b) may be used in a free acid form. However, when the magenta dye (M-2b) is obtained in a salt form at the time of producing, it may be used without conversion or may be converted into a desired salt form. Moreover, with respect to the magenta dye (M-2b), a part of the acid groups may be in a salt form, and both a salt-form dye and a free acid-form dye may be present. Examples of such a salt form include salts of alkali metals such as Na, Li, K, and the like; salts of ammonium optionally substituted by an alkyl group or a hydroxyalkyl group; salts of organic amines; and the like. Examples of the organic amine include a lower alkylamine, a hydroxy-substituted lower alkylamine, a carboxy-substituted lower alkylamine, a polyamine having 2 to 10 alkyleneimine units each having 2 to 4 carbon atoms, and the like. The number of the types of these salts used is not limited to 1, but a plurality of types of the salts may be present.

Another embodiment of the magenta dye (M-2b) is an embodiment where, for example, in the general formula (M-2b), r is 0; $R_{18}$ is a carboxyl group, a carbamoyl group, a trifluoromethyl group, or a sulfamoyl group; $R_{19}$, $R_{20}$, and $R_{22}$ each are a hydrogen atom; $R_{21}$ is a phenyl group or a carboxy alkyl group optionally substituted by a carboxyl group or a sulfamoyl group; and $R_{23}$ is a hydrogen atom or an alkyl group.

Examples of the magenta dye (M-2b) include compounds represented by the chemical formulae (M-2b-1) to (M-2b-5).

(M-2b-1)

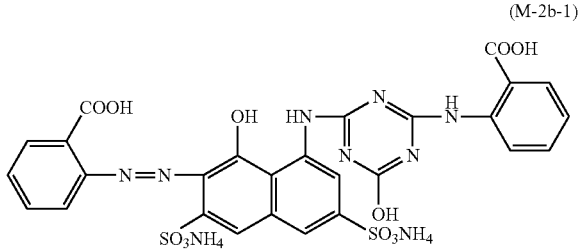

The compound represented by the chemical formula (M-2b-1) is an embodiment, where in the general formula (M-2b), r is 0; $R_{18}$ is a carboxyl group at the 2-position of a phenyl group bonded to an azo group; $R_{19}$, $R_{20}$ and $R_{22}$ each are a hydrogen atom; $R_{21}$ is a 2-carboxyphenyl group; and $R_{23}$ is a hydrogen atom. In the compound represented by the chemical formula (M-2b-1), sulfonic acids at the 3-position and 6-position of a naphthalene ring are ammonium salts.

(M-2b-2)

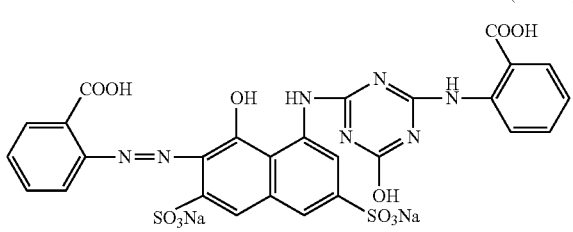

The compound represented by the chemical formula (M-2b-2) is another embodiment, where in the general formula (M-2b), r is 0; $R_{18}$ is a carbamoyl group at the 2-position of a phenyl group bonded to an azo group; $R_{19}$, $R_{20}$ and $R_{22}$ each are a hydrogen atom; $R_{21}$ is a 2-carboxyphenyl group; and $R_{23}$ is a hydrogen atom. In the compound represented by the chemical formula (M-2b-2), sulfonic acids at the 3-position and 6-position of a naphthalene ring are sodium salts.

(M-2b-3)

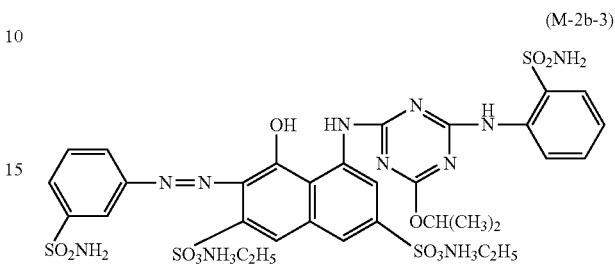

The compound represented by the chemical formula (M-2b-3) is still another embodiment, where in the general formula (M-2b), r is 0; $R_{18}$ is a sulfamoyl group at the 3-position of a phenyl group bonded to an azo group; $R_{19}$, $R_{20}$ and $R_{22}$ each are a hydrogen atom; $R_{21}$ is a 2-sulfamoylphenyl group; and $R_{23}$ is an isopropyl group. In the compound represented by the chemical formula (M-2b-3), sulfonic acids at the 3-position and 6-position of a naphthalene ring are ethylammonium salts.

(M-2b-4)

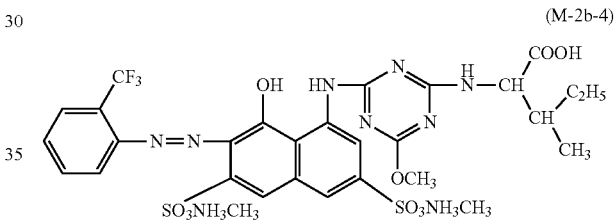

The compound represented by the chemical formula (M-2b-4) is yet another embodiment, where in the general formula (M-2b), r is 0; $R_{18}$ is a trifluoromethyl group at the 2-position of a phenyl group bonded to an azo group; $R_{19}$, $R_{20}$ and $R_{22}$ each are a hydrogen atom; $R_{21}$ is a 1-carboxy-2-methylbutyl group; and $R_{23}$ is a methyl group. In the compound represented by the chemical formula (M-2b-4), sulfonic acids at the 3-position and 6-position of a naphthalene ring are methylammonium salts.

(M-2b-5)

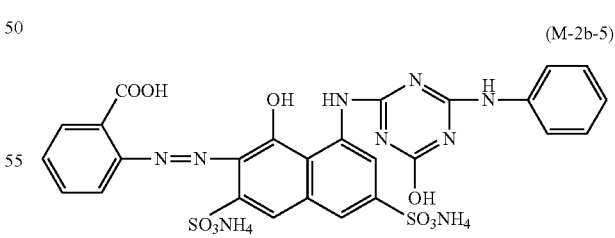

The compound represented by the chemical formula (M-2b-5) is yet another embodiment, where in the general formula (M-2b), r is 0; $R_{18}$ is a carboxyl group at the 2-position of a phenyl group bonded to an azo group; $R_{19}$, $R_{20}$ and $R_{22}$ each are a hydrogen atom; $R_{21}$ is a phenyl group; and $R_{23}$ is a hydrogen atom. In the compound represented by the chemical formula (M-2b-5), sulfonic acids at the 3-position and 6-position of a naphthalene ring are ammonium salts.

C. I. Acid Red 1 is, for example, a dye represented by the structural formula (M-2c).

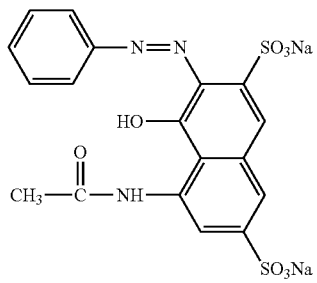

(M-2c)

In the case where the magenta dye (M-2) is at least one dye selected from the group consisting of the magenta dye (M-2b), C. I. Acid Red 1, and C. I. Acid Red 254, by containing the magenta dye (M-1) in the water-based magenta ink, ozone resistance and light resistance may be improved. In this case, the amount of the magenta dye (M-1) to be added is not particularly limited, and is, for example, in the range of about 0.1 wt % to about 10 wt %, and about 1.4 wt % to about 5.4 wt % with respect to the amount of the water-based magenta ink.

In the case where the magenta dye (M-2) is at least one dye selected from the group consisting of the magenta dye (M-2b), C. I. Acid Red 1, and C. I. Acid Red 254, by containing the magenta dye (M-2) in the water-based magenta ink, color developing properties may be improved. In this case, the amount of the magenta dye (M-2) to be added is not particularly limited, and is, for example, in the range of about 0.05 wt % to about 5 wt %, and about 0.2 wt % to about 1.8 wt % with respect to the amount of the water-based magenta ink.

In the case where the magenta dye (M-2) is at least one dye selected from the group consisting of the magenta dye (M-2b), C. I. Acid Red 1, and C. I. Acid Red 254, the weight ratio of the magenta dye (M-1) to the magenta dye (M-2) in the water-based magenta ink may be in the range of about 70:30 to about 90:10 (magenta dye (M-1): magenta dye (M-2)). By setting the weight ratio to be in the aforementioned range, a water-based magenta ink with excellent color developing properties, ozone resistance, and light resistance may be obtained.

The total amount of the magenta dye (M-1) and the magenta dye (M-2) to be added is not particularly limited, and may be in the range of about 2 wt % to about 6 wt % with respect to the amount of the water-based magenta ink. By setting the total amount to be added to be in the aforementioned range, a water-based magenta ink with excellent storing stability, color developing properties, ozone resistance, light resistance, and ejection stability may be obtained.

The magenta coloring agent may further contain other dyes and pigments besides the magenta dye (M-1) and the magenta dye (M-2).

The water and the amount of the water to be added are the same as those described for the water-based yellow ink.

The water-soluble organic solvent and the amount of the water-soluble organic solvent to be added also are the same as those described for the water-based yellow ink.

The water-based magenta ink may further contain a conventionally known additive as required. The additive also is the same as that described for the water-based yellow ink.

The water-based magenta ink may be prepared by uniformly mixing a magenta coloring agent, water, a water-soluble organic solvent with other addition components as required by a conventionally known method, and then removing sediments with a filter, for example.

(Water-Based Cyan Ink)

The water-based cyan ink will be described. As mentioned above, the water-based cyan ink contains a cyan coloring agent, water, and a water-soluble organic solvent. The cyan coloring agent contains the cyan dye (C-1).

As mentioned above, the cyan dye (C-1) is a dye represented by the general formula (C-1).

A compound represented by the general formula (C-1) may be a compound in which all of rings $A_{31}$, $A_{32}$, and $A_{33}$ are 2,3-pyridine rings or 3,2-pyridine rings; a compound in which two of the same are 2,3-pyridine rings or 3,2-pyridine rings and the other one is a benzene ring; or a compound in which one of the same is a 2,3-pyridine ring or a 3,2-pyridine ring and the other two are benzene rings. The cyan dye (C-1) may be composed of one of the aforementioned compounds or may be a mixture containing two or more of them.

Examples of the cyan dye (C-1) include compounds represented by the chemical formulae (C-1a) to (C-1f).

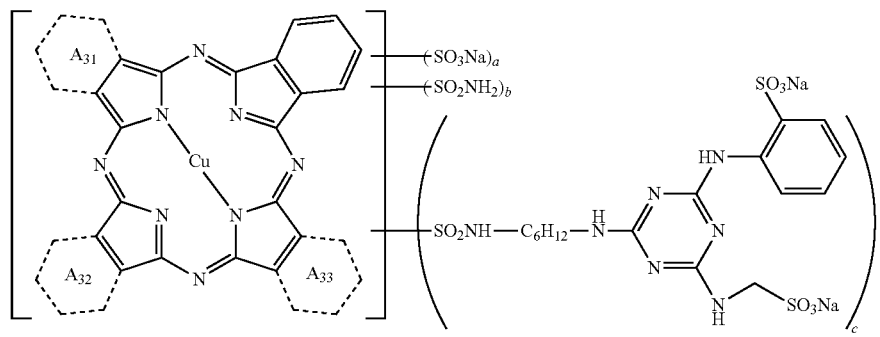

(C-1a)

In the chemical formula (C-1a), rings $A_{31}$, $A_{32}$, and $A_{33}$ each independently represent a 2,3-pyridine ring or a 3,2-pyridine ring; a is 1.0; b is 1.8; c is 1.2; and a, b, and c are average values in a mixture.

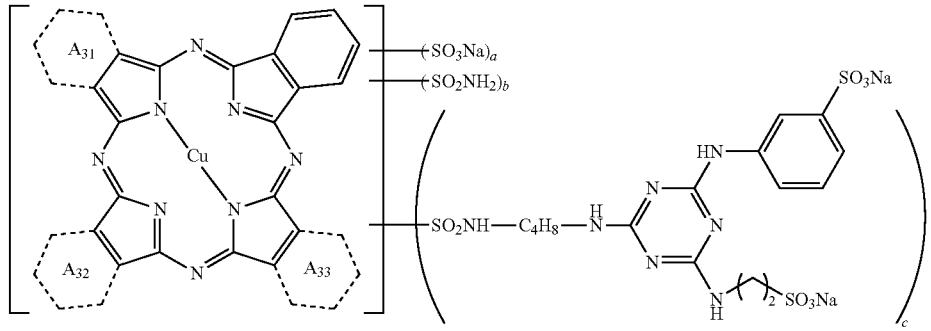

(C-1b)

In the chemical formula (C-1b), rings $A_{31}$ and $A_{32}$ each independently represent a 2,3-pyridine ring or a 3,2-pyridine ring; a ring $A_{33}$ represents a benzene ring; a is 2.4; b is 0.6; c is 1.0; and a, b, and c are average values in a mixture.

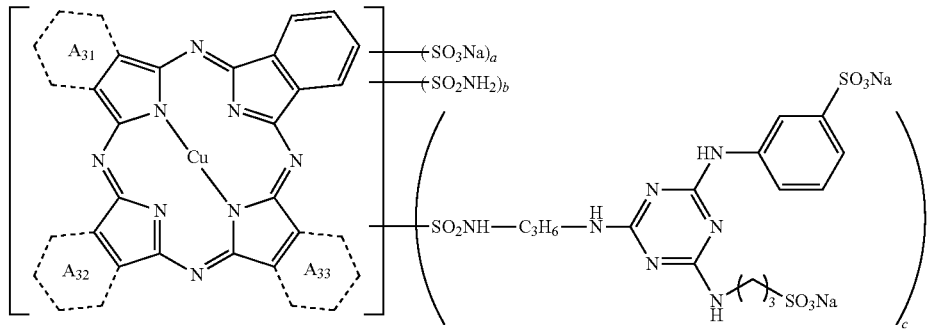

(C-1c)

In the chemical formula (C-1c), rings $A_{31}$, $A_{32}$, and $A_{33}$ each independently represent a 2,3-pyridine ring or a 3,2-pyridine ring; a is 3.0; b is 0.2; c is 0.8; and a, b, and c are average values in a mixture.

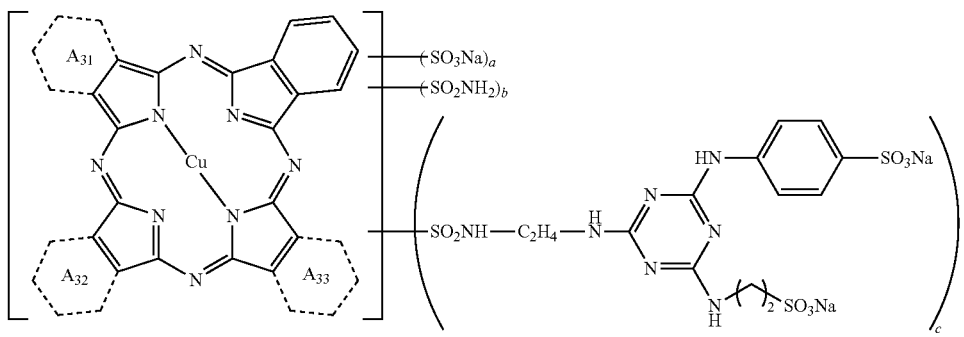

(C-1d)

In the chemical formula (C-1d), a ring $A_{31}$ represents a benzene ring; rings $A_{32}$ and $A_{33}$ each independently represent a 2,3-pyridine ring or a 3,2-pyridine ring; a is 1.8; b is 0.9; c is 1.3; and a, b, and c are average values in a mixture.

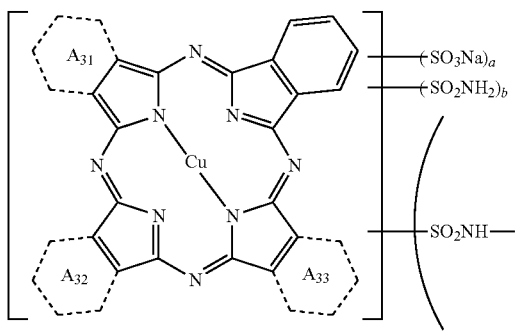

(C-1e)

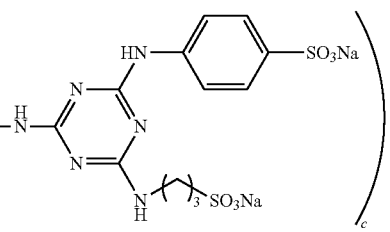

In the chemical formula (C-1e), rings $A_{31}$, $A_{32}$, and $A_{33}$ each independently represent a 2,3-pyridine ring or a 3,2-pyridine ring; a is 1.1; b is 1.3; c is 1.6; and a, b, and c are average values in a mixture.

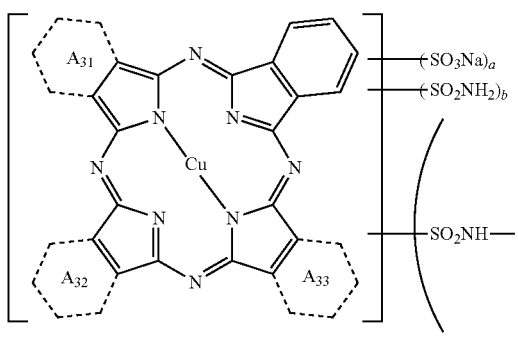

(C-1f)

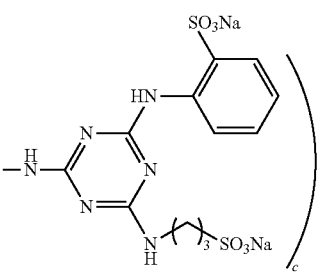

In the chemical formula (C-1f), rings $A_{31}$ and $A_{33}$ each independently represent a 2,3-pyridine ring or a 3,2-pyridine ring; a ring $A_{32}$ represents a benzene ring; a is 0; b is 1.8; c is 2.2; and a, b, and c are average values in a mixture.

The cyan coloring agent may be composed of only the cyan dye (C-1), or may further contain other dyes and pigments besides the cyan dye (C-1). Examples of the other dyes include the following cyan dye (C-2). Cyan dye (C-2): at least one dye selected from the group consisting of dyes represented by the general formula (C-2a), dyes represented by the general formula (C-2b), C. I. Direct Blue 199, and C. I. Direct Blue 86

(C-2a)

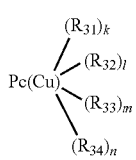

In the general formula (C-2a),
Pc (Cu) represents a copper phthalocyanine nucleus represented by the general formula (Pc);

$R_{31}$, $R_{32}$, $R_{33}$, and $R_{34}$ each represent a substituent selected from the group consisting of a —$SO_2R_a$, a —$SO_2NR_bR_c$, and a —$CO_2R_a$; $R_{31}$, $R_{32}$, $R_{33}$, and $R_{34}$ are not all identical to each other; at least one of $R_{31}$, $R_{32}$, $R_{33}$, and $R_{34}$ has an ionic hydrophilic group as a substituent; at least one of $R_{31}$, $R_{32}$, $R_{33}$, and $R_{34}$ is present on any of four benzene rings A, B, C, and D of the copper phthalocyanine nucleus represented by the general formula (Pc); $R_a$ represents a substituted or unsubstituted alkyl group; $R_b$ represents a hydrogen atom or a substituted or unsubstituted alkyl group; $R_c$ represents a substituted or unsubstituted alkyl group;

k satisfies $0<k<8$; l satisfies $0<l<8$; m satisfies $0\leq m<8$; n satisfies $0\leq n<8$; and k, l, m, and n satisfy $4\leq k+l+m+n\leq 8$.

(C-2b)

In the general formula (C-2b),
Pc (Cu) represents a copper phthalocyanine nucleus represented by the following general formula (Pc);
$M_0$ represents any of lithium, sodium, potassium, and ammonium; x satisfies $0<x<4$; y satisfies $0<y<4$; x and y satisfy $2\leq x+y\leq 5$; and a —$SO_3M_0$ and a —$SO_2NH_2$ are present on any of four benzene rings A, B, C, and D of the copper phthalocyanine nucleus represented by the general formula (Pc).

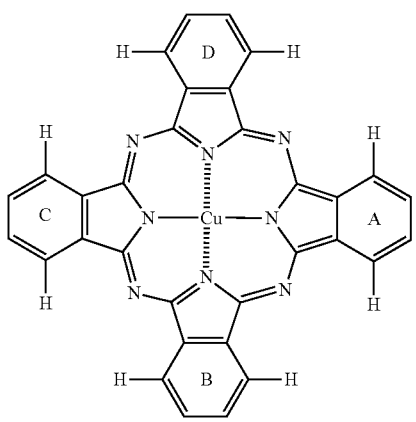

(Pc)

In the general formula (C-2a), the substituted or unsubstituted alkyl group may be a straight chain, branched chain or alicyclic alkyl group having 1 to 12 carbon atoms. The alkyl group may be the one having a branched chain, in particular, the one having an asymmetric carbon atom (in the form of a racemic body) from the view point of improving the solubility of the dye and the stability of the water-based cyan ink. Examples of the substituted or unsubstituted alkyl group include a methyl group, an ethyl group, a n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, and the like.

In the general formula (C-2a), examples of a substituent of the substituted alkyl group include a straight chain or branched chain alkyl group having 1 to 12 carbon atoms, such as a methyl group, an ethyl group, a propyl group, an isopropyl group, a sec-butyl group, a tert-butyl group, a 2-ethylhexyl group, a 2-methylsulfonyl ethyl group, a 3-phenoxy propyl group, a trifluoromethyl group, a cyclopentyl group, or the like; a straight chain or branched chain aralkyl group having 7 to 18 carbon atoms; a straight chain or branched chain alkenyl group having 2 to 12 carbon atoms; a straight chain or branched chain alkynyl group having 2 to 12 carbon atoms; a straight chain or branched chain cycloalkyl group having 3 to 12 carbon atoms; a straight chain or branched chain cycloalkenyl group having 3 to 12 carbon atoms; a halogen atom such as a chlorine atom, a bromine atom, or the like; an aryl group such as a phenyl group, a 4-tert-butylphenyl group, a 2,4-di-tert-aminophenyl group, or the like; a heterocyclic group such as an imidazolyl group, a pyrazolyl group, a triazolyl group, a 2-furil group, a 2-thienyl group, a 2-pyrimidinyl group, a 2-benzothiazolyl group, or the like; a cyano group; a hydroxyl group; a nitro group; a carboxyl group; an amino group; an alkoxy group such as a methoxy group, an ethoxy group, a 2-methoxyethoxy group, a 2-methanesulfonylethoxy group, or the like; an aryloxy group such as a phenoxy group, a 2-methylphenoxy group, a 4-tert-butylphenoxy group, a 3-nitrophenoxy group, a 3-tert-butoxycarbamoylphenoxy group, a 3-methoxycarbamoyl group, or the like; an acylamino group such as an acetamide group, a benzamide group, a 4-(3-tert-butyl-4-hydroxyphenoxy) butanamide group, or the like; an alkylamino group such as a methylamino group, a butylamino group, a diethylamino group, a methylbutylamino group, or the like; an anilino group such as a phenylamino group, a 2-chloroanilino group, or the like; an ureide group such as a phenylureide group, a methylureide group, an N,N-dibutylureide group, or the like; a sulfamoylamino group such as an N,N-dipropylsulfamoylamino group or the like; an alkylthio group such as a methylthio group, an octylthio group, a 2-phenoxyethylthio group, or the like; an arylthio group such as a phenylthio group, a 2-butoxy-5-tert-octylphenylthio group, a 2-carboxyphenylthio group, or the like; an alkoxycarbonylamino group such as a methoxycarbonylamino group or the like; a sulfonamide group such as a methanesulfonamide group, a benzenesulfonamide group, a p-toluenesulfonamide group, or the like; a carbamoyl group such as an N-ethylcarbamoyl group, an N,N-dibutylcarbamoyl group, or the like; a sulfamoyl group such as an N-ethylsulfamoyl group, an N,N-dipropylsulfamoyl group, an N-phenylsulfamoyl group or the like; a sulfonyl group such as a methanesulfonyl group, an octanesulfonyl group, a benzenesulfonyl group, a toluenesulfonyl group, or the like; an alkoxycarbonyl group such as a methoxycarbonyl group, a butoxycarbonyl group, or the like; a heterocyclic oxy group such as a 1-phenyltetrazole-5-oxy group, a 2-tetrahydroxypyranyloxy group, or the like; an azo group such as a phenylazo group, a 4-methoxyphenylazo group, a 4-pivaloylaminophenylazo group, a 2-hydroxy-4-propanoylphenylazo group, or the like; an acyloxy group such as an acetoxy group or the like; a carbamoyloxy group such as an N-methylcarbamoyloxy group, an N-phenylcarbamoyloxy group, or the like; a silyloxy group such as a trimethylsilyloxy group, a dibutylmethylsilyloxy group, or the like; an aryloxycarbonylamino group such as a phenoxycarbonylamino group or the like; an imide group such as an N-succinimide group, an N-pthalimide group, or the like; a heterocyclic thio group such as a 2-benzothiazolylthio group, a 2,4-diphenoxy-1,3,5-triazole-6-thio group, a 2-pyridylthio group, or the like; a sulfinyl group such as a 3-phenoxypropylsulfinyl group or the like; a phosphonyl group such as a phenoxyphosphonyl group, an octyloxyphosphonyl group, a phenylphosphonyl group, or the like; an aryloxycarbonyl group such as a phenoxycarbonyl group or the like; an acyl group such as an acetyl group, a 3-phenylpropanoyl group, a benzoyl group, or the like; an ionic hydrophilic group such as a carboxyl group, a sulfo group, a phosphono group, a quaternary ammonium group, or the like; and the like. The alkyl group, the aralkyl group, the alkenyl group, the alkynyl group, the cycloalkyl group, and the cycloalkenyl group as the substituent of the substituted alkyl group may be those having a branched chain, in particular, those having an asymmetric carbon atom, from the view point of improving the solubility of the dye and the stability of the water-based cyan ink.

Embodiment of the cyan dye (C-2a) is an embodiment where, for example, in the general formula (C-2a), $R_{31}$, $R_{32}$, $R_{33}$, and $R_{34}$ each represent a —$SO_2R_a$; the respective $R_a$s in $R_{31}$, $R_{32}$, $R_{33}$, and $R_{34}$ are not all identical; and at least one of the $R_a$s is a substituted alkyl group having an ionic hydrophilic group.

Embodiment of the cyan dye (C-2a) is an embodiment where, for example, in the general formula (C-2a), k satisfies $0<k<4$, l satisfies $0<l<4$, m satisfies $0\leq m<4$, n satisfies $0\leq n<4$, and k, l, m, and n satisfy $k+l+m+n=4$.

Examples of the cyan dye (C-2a) include compounds represented by the general formulae (C-2a-1) to (C-2a-5).

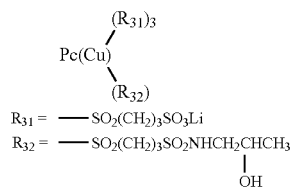

(C-2a-1)

$R_{31} = $ —$SO_2(CH_2)_3SO_3Li$
$R_{32} = $ —$SO_2(CH_2)_3SO_2NHCH_2CHCH_3$
                                              |
                                              OH

The compound represented by the chemical formula (C-2a-1) is an embodiment, where in the general formula (C-2a), $R_{31}$ is a lithium sulfonato propylsulfonyl group, $R_{32}$ is an N-(2-hydroxypropyl) sulfamoylpropylsulfonyl group, k is 3, l is 1, and m and n are both 0.

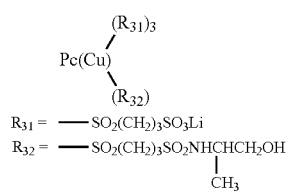

(C-2a-2)

$R_{31} = $ —$SO_2(CH_2)_3SO_3Li$
$R_{32} = $ —$SO_2(CH_2)_3SO_2NHCHCH_2OH$
                                              |
                                              $CH_3$

The compound represented by the chemical formula (C-2a-2) is another embodiment, where in the general formula (C-2a), $R_{31}$ is a lithium sulfonato propylsulfonyl group, $R_{32}$ is an N-(2-hydroxyisopropyl) sulfamoylpropylsulfonyl group, k is 3, l is 1, and m and n are both 0.

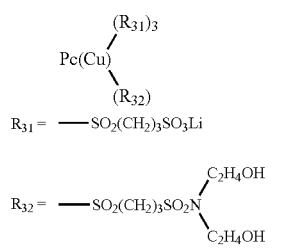

(C-2a-3)

$R_{31} = $ —$SO_2(CH_2)_3SO_3Li$ $R_{32} = $ —$SO_2(CH_2)_3SO_2N\begin{matrix}C_2H_4OH \\ C_2H_4OH\end{matrix}$ The compound represented by the chemical formula (C-2a-3) is still another embodiment, where in the general formula (C-2a), $R_{31}$ is a lithium sulfonato propylsulfonyl group, $R_{32}$ is an N,N-(di(2-hydroxyethyl)) sulfamoylpropylsulfonyl group, k is 3, l is 1, and m and n are both 0.

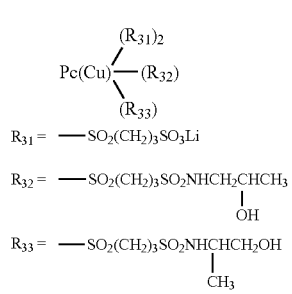

(C-2a-4)

$R_{31} = $ —$SO_2(CH_2)_3SO_3Li$ $R_{32} = $ —$SO_2(CH_2)_3SO_2NHCH_2CHCH_3$
                                              |
                                              OH $R_{33} = $ —$SO_2(CH_2)_3SO_2NHCHCH_2OH$
                                              |
                                              $CH_3$

The compound represented by the chemical formula (C-2a-4) is yet another embodiment, where in the general formula (C-2a), $R_{31}$ is a lithium sulfonato propylsulfonyl group, $R_{32}$ is an N-(2-hydroxypropyl) sulfamoylpropylsulfonyl group, $R_{33}$ is an N-(2-hydroxyisopropyl) sulfamoylpropylsulfonyl group, k is 2, l is 1, m is 1, and n is 0.

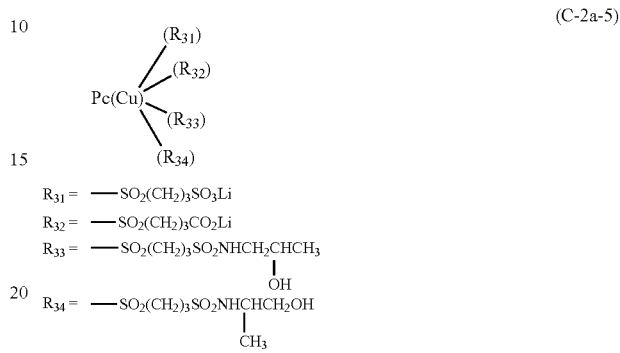

(C-2a-5)

$R_{31} = $ —$SO_2(CH_2)_3SO_3Li$
$R_{32} = $ —$SO_2(CH_2)_3CO_2Li$
$R_{33} = $ —$SO_2(CH_2)_3SO_2NHCH_2CHCH_3$
                                              |
                                              OH
$R_{34} = $ —$SO_2(CH_2)_3SO_2NHCHCH_2OH$
                                              |
                                              $CH_3$

The compound represented by the chemical formula (C-2a-5) is yet another embodiment, where in the general formula (C-2a), $R_{31}$ is a lithium sulfonato propylsulfonyl group, $R_{32}$ is a lithium carboxylate propylsulfonyl group, $R_{33}$ is an N-(2-hydroxypropyl) sulfamoylpropylsulfonyl group, $R_{34}$ is an N-(2-hydroxyisopropyl) sulfamoylpropylsulfonyl group, and k, l, m, and n are all 1.

In the general formula (C-2b), the $M_0$ may be ionized in a water-based cyan ink (any of $Li^+$, $Na^+$, $K^+$, and $NH_4^+$). With respect to the water-based cyan ink, in the general formula (C-2b), x and y may satisfy x+y=4.

Examples of the cyan dye (C-2b) include compounds represented by the chemical formulae (C-2b-1) to (C-2b-4).

(C-2b-1)

The compound represented by the chemical formula (C-2b-1) is an embodiment, where in the general formula (C-2b), $M_0$ is sodium, x is 1, y is 3, and a substituent is present on each of the four benzene rings A, B, C, and D of the copper phthalocyanine nucleus represented by the general formula (Pc).

(C-2b-2)

The compound represented by the chemical formula (C-2b-2) is another embodiment, where in the general formula (C-2b), $M_0$ is sodium, x is 2, y is 2, and a substituent is present on each of the four benzene rings A, B, C, and D of the copper phthalocyanine nucleus represented by the general formula (Pc).

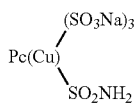
(C-2b-3)

The compound represented by the chemical formula (C-2b-3) is still another embodiment, where in the general formula (C-2b), $M_0$ is sodium, x is 3, y is 1, and a substituent is present on each of the four benzene rings A, B, C, and D of the copper phthalocyanine nucleus represented by the general formula (Pc).

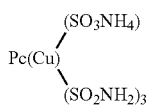
(C-2b-4)

The compound represented by the chemical formula (C-2b-4) is yet another embodiment, where in the general formula (C-2b), $M_0$ is ammonium, x is 1, y is 3, and a substituent is present on each of the four benzene rings A, B, C, and D of the copper phthalocyanine nucleus represented by the general formula (Pc).

C. I. Direct Blue 86 is, for example, a dye represented by the chemical formula (C-2c).

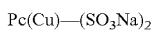
(C-2c)

In the case where the cyan dye (C-2) is used besides the cyan dye (C-1), the amount of the cyan dye (C-1) to be added is not particularly limited. By containing the cyan dye (C-1) in the water-based cyan ink, storing stability, ozone resistance, light resistance, and ejection stability may be improved. The amount of the cyan dye (C-1) to be added is, for example, in the range of about 0.1 wt % to about 10 wt %, about 1.4 wt % to about 5.7 wt %, and about 1.6 wt % to about 4.8 wt % with respect to the amount of the water-based cyan ink.

In the case where the cyan dye (C-2) is used besides the cyan dye (C-1), the amount of the cyan dye (C-2) to be added is not particularly limited. By containing the cyan dye (C-2) in the water-based cyan ink, color developing properties may be improved. The amount of the cyan dye (C-2) to be added is, for example, in the range of about 0.05 wt % to about 5 wt %, about 0.1 wt % to about 1.8 wt %, and about 0.1 wt % to about 1.5 wt % with respect to the amount of the water-based cyan ink.

In the case where the cyan dye (C-2) is used besides the cyan dye (C-1), the weight ratio of the cyan dye (C-1) to the cyan dye (C-2) in the water-based cyan ink may be in the range of about 70:30 to about 95:5 (cyan dye (C-1): cyan dye (C-2)). By setting the weight ratio to be in the aforementioned range, a water-based cyan ink with excellent ejection stability besides excellent storing stability, color developing properties, ozone resistance, and light resistance may be obtained.

The total amount of the cyan dye (C-1) and the cyan dye (C-2) to be added is not particularly limited, and may be in the range of about 2 wt % to about 6 wt % with respect to the amount of the water-based cyan ink. By setting the total amount to be added to be in the aforementioned range, a water-based cyan ink with excellent storing stability, color developing properties, ozone resistance, light resistance, and ejection stability may be obtained.

The water and the amount of the water to be added are the same as those described for the water-based yellow ink.

The water-soluble organic solvent and the amount of the water-soluble organic solvent to be added are the same as those described for the water-based yellow ink.

The water-based cyan ink may further contain a conventionally known additive as required. The additive also is the same as that described for the water-based yellow ink.

The water-based cyan ink may be prepared by uniformly mixing a cyan coloring agent, water, and a water-soluble organic solvent with other addition components as required by a conventionally known method, and then removing sediments with a filter, for example.

The water-based ink set for the ink jet recording is applicable to full-color recording when it includes the water-based inks of the aforementioned three colors. The water-based ink set may be configured of only the water-based inks of the aforementioned three colors, or may further include a water-based ink of a color other than the three colors. Examples of the water-based ink of a color other than the three colors include a water-based black ink, a water-based red ink, a water-based green ink, a water-based blue ink, water-based light inks with low concentrations of coloring agent (a water-based light yellow ink, a water-based light magenta ink, a water-based light cyan ink, a water-based light black ink, a water-based light red ink, a water-based light green ink, a water-based light blue ink, and the like), and the like. The water-based ink set may further contain a water-based black ink because it becomes applicable to full-color recording.

Next, the ink cartridge will be described. The ink cartridge includes a containing portions for a water-based yellow ink, a water-based magenta ink, and a water-based cyan ink, respectively. The water-based yellow ink, the water-based magenta ink, and the water-based cyan ink are the aforementioned water-based yellow ink, the aforementioned water-based magenta ink, and the aforementioned water-based cyan ink in the aforementioned water-based ink set for ink-jet recording, respectively. The ink cartridge may further include a containing portion for the water-based ink of a color other than the aforementioned three colors.

The ink cartridge may be an ink cartridge assembly obtained by assembling plural ink cartridges each having a containing portion for a water-based ink of each color. The ink cartridge may be an integrated ink cartridge in which the inside is partitioned so that containing portions of water-based inks of the respective colors are formed. As the body of the ink cartridge, a conventionally know body may be used, for example.

Next, the ink-jet recording apparatus will be described. The ink-jet recording apparatus comprises an ink storing portion and an ink ejecting unit, and an ink stored in the ink storing portion is ejected by the ink ejecting unit. The ink cartridge is stored in the ink storing portion. Except for this, the ink-jet recording apparatus may have a configuration similar to that of a conventionally known ink-jet recording apparatus, for example.

As shown in FIG. 1, an ink-jet recording apparatus 1 comprises four ink cartridges 2, an ink ejecting unit (ink-jet head) 3, a head unit 4, a carriage 5, a drive unit 6, a platen roller 7, and a purge unit 8 as main components.

The four ink cartridges 2 contain water-based inks of four colors, namely, yellow, magenta, cyan, and black, respectively. For example, water-based inks of three colors of yellow, magenta, and cyan are the water-based yellow ink, the water-based magenta ink, and the water-based cyan ink in the aforementioned water-based ink set, respectively. The ink-jet head 3 performs recording on a recording medium P such as a recording paper. The head unit 4 is provided with the ink-jet head 3. The four ink cartridges 2 and the head unit 4 are mounted on the carriage 5. The drive unit 6 reciprocates the carriage 5 in a straight line. As the drive unit 6, a conventionally known drive unit may be used (see JP 2008-246821 A, for example). The platen roller 7 extends in the reciprocating direction of the carriage 5 and is arranged so as to face to the ink-jet head 3. The recording includes recording of letters; images; printing; and the like.

The recording medium P is fed from a paper feeding cassette (not shown) positioned on a side of or underneath the ink-jet recording apparatus 1. The recording medium P is introduced between the ink-jet head 3 and the platen roller 7. Then, a predetermined recording is performed on the recording medium P with the ink ejected from the ink-jet head 3. The recording medium P then is discharged from the ink-jet recording apparatus 1. In FIG. 1, a feeding mechanism and a discharging mechanism of the recording medium P are not shown.

The purge unit 8 draws poor inks containing, for example, air bubbles trapped inside the ink-jet head 3. As the purge unit 8, a conventionally known purge unit may be used (see JP 2008-246821 A, for example).

On the platen roller 7 side of the purge unit 8, a wiper member 20 is provided adjacent to the purge unit 8. The wiper member 20 has a spatula shape, and wipes a nozzle-formed surface of the ink-jet head 3 accompanying the movement of the carriage 5. In FIG. 1, a cap 18 covers a plurality of nozzles of the ink-jet head 3, which returns to the reset position after completion of the recording, in order to prevent the inks from drying.

In the ink-jet recording apparatus, the four ink cartridges may be mounted on a plurality of carriages. Alternatively, the four ink cartridges may not be mounted on the carriage, but may be arranged and fixed in the ink-jet recording apparatus. In such an embodiment, for example, the ink cartridges are connected to the head unit mounted on the carriage via a tube or the like, and the inks are supplied to the head unit from the ink cartridges.

Next, an ink-jet recording method with the water-based ink set for ink-jet recording is described. The ink-jet recording method performs recording with water-based inks configuring the water-based ink set for ink-jet recording. The water-based ink set comprises a water-based yellow ink, a water-based magenta ink, and a water-based cyan ink. The water-based yellow ink contains a yellow coloring agent, water, and a water-soluble organic solvent. The yellow coloring agent contains the yellow dye (Y-1) and the yellow dye (Y-2). The water-based magenta ink contains a magenta coloring agent, water, and a water-soluble organic solvent. The magenta coloring agent contains the magenta dye (M-1) and the magenta dye (M-2). The water-based cyan ink contains a cyan coloring agent, water, and a water-soluble organic solvent. The cyan coloring agent contains the cyan dye (C-1). The ink-jet recording method may be performed using, for example, the ink-jet recording apparatus shown in FIG. 1.

In the ink-jet recording method, the weight ratio of the water-based yellow dye (Y-1) to the water-based yellow dye (Y-2) in the water-based yellow ink may be set in the range of about 50:50 to about 95:5, and about 60:40 to about 90:10 (yellow dye (Y-1): yellow dye (Y-2)).

In the ink-jet recording method, the dye represented by the general formula (M-2a) may be used as the magenta dye (M-2), and the weight ratio of the magenta dye (M-1) to the magenta dye (M-2) in the water-based magenta ink may be set in the range of about 60:40 to about 20:80 (magenta dye (M-1): magenta dye (M-2)).

In the ink-jet recording method, at least one dye selected from the group consisting of the dyes represented by the general formula (M-2b), C. I. Acid Red 1, and C. I. Acid Red 254 may be used as the magenta dye (M-2), and the weight ratio of the magenta dye (M-1) to the magenta dye (M-2) in the water-based magenta ink may be set in the range of about 70:30 to about 90:10 (magenta dye (M-1): magenta dye (M-2)).

In the ink-jet recording method, the cyan coloring agent may further contain the cyan dye (C-2), and the weight ratio of the cyan dye (C-1) to the cyan dye (C-2) in the water-based cyan ink may be set in the range of about 70:30 to about 95:5 (cyan dye (C-1): cyan dye (C-2)).

In the ink-jet recording method, the total amount of the yellow coloring agent to be added with respect to the amount of the water-based yellow ink may be set in the range of about 2 wt % to about 6 wt %, the total amount of the magenta coloring agent to be added with respect to the amount of the water-based magenta ink may be set in the range of about 2 wt % to about 6 wt %, and the total amount of the cyan coloring agent to be added with respect to the amount of the water-based cyan ink may be set in the range of about 2 wt % to about 6 wt %.

EXAMPLES

Next, examples will be described together with comparative examples. It is to be noted that the present invention is not limited by the following examples and comparative examples.

[Preparation of Water-Based Yellow Ink]

Water-based yellow inks Y1 to Y11 and Y12c to Y16c were obtained by mixing their ink components (Table 2) uniformly and then filtering the resultant mixtures respectively through a hydrophilic polytetrafluoroethylene (PTFE) type membrane filter (pore diameter: 0.20 μm) manufactured by Toyo Roshi Kaisha, Ltd. In Table 2, yellow dyes (Y-1a) to (Y-1e) are compounds represented by the chemical formulae (Y-1a) to (Y-1e), respectively.

[Preparation of Water-Based Magenta Ink]

Water-based magenta inks M1 to M14 and M15c to M25c were obtained by mixing their ink components (Tables 3 and 4) uniformly and then filtering the resultant mixtures respectively through a hydrophilic polytetrafluoroethylene (PTFE) type membrane filter (pore diameter: 0.20 μm) manufactured by Toyo Roshi Kaisha, Ltd. In Tables 3 and 4, magenta dyes (M-1a) to (M-1e) are compounds represented by the magenta dyes (M-1a) to (M-1e) summarized in Table 1, respectively, magenta dyes (M-2a-1) to (M-2a-5) are compounds represented by the chemical formulae (M-2a-1) to (M-2a-5), respectively, and the magenta dyes (M-2b-2), (M-2b-4), and (M-2b-5) are compounds represented by the chemical formulae (M-2b-2), (M-2b-4), and (M-2b-5), respectively.

[Preparation of Water-Based Cyan Ink]

Water-based cyan inks C1 to C21 and C22c to C29c were obtained by mixing their ink components (Tables 5 and 6) uniformly and then filtering the resultant mixtures respectively through a hydrophilic polytetrafluoroethylene (PTFE) type membrane filter (pore diameter: 0.20 μm) manufactured by Toyo Roshi Kaisha, Ltd. In Tables 5 and 6, cyan dyes (C-1a) to (C-1e) are compounds represented by the chemical formulae (C-1a) to (C-1e), respectively, cyan dyes (C-2a-1), (C-2a-2), and (C-2a-5) are compounds represented by the chemical formulae (C-2a-1), (C-2a-2), and (C-2a-5), respectively, and cyan dyes (C-2b-2) and (C-2b-3) are compounds represented by the chemical formulae (C-2b-2) and (C-2b-3), respectively.

TABLE 2

| | | | Water-based yellow ink | | | | | | | | | | | | | | | |
|---|---|---|---|---|---|---|---|---|---|---|---|---|---|---|---|---|---|---|
| | | | Y1 | Y2 | Y3 | Y4 | Y5 | Y6 | Y7 | Y8 | Y9 | Y10 | Y11 | Y12c | Y13c | Y14c | Y15c | Y16c |
| Ink composition (wt %) | Yellow dye (Y-1) | Yellow dye (Y-1a) | 3.0 | — | — | — | — | 1.5 | — | — | — | 3.8 | — | 4.0 | — | — | — | — |
| | | Yellow dye (Y-1b) | — | 2.4 | — | — | — | — | 4.5 | — | — | — | 2.0 | — | — | — | 3.0 | — |
| | | Yellow dye (Y-1c) | — | — | 3.6 | — | — | — | — | 0.75 | — | — | — | — | — | — | — | — |
| | | Yellow dye (Y-1d) | — | — | — | 2.25 | — | — | — | — | 4.8 | — | — | — | — | — | — | — |
| | | Yellow dye (Y-1e) | — | — | — | — | 3.75 | — | — | — | — | — | — | — | — | — | — | — |
| | Yellow dye (Y-2) | C.I. Direct Yellow 86 | 1.0 | — | — | 0.75 | — | 0.5 | 1.5 | — | — | 0.2 | — | — | 3.0 | — | — | — |
| | | C.I. Direct Yellow 132 | — | 1.6 | — | — | 1.25 | — | — | 0.25 | — | — | 2.0 | — | — | 4.0 | — | 3.0 |
| | | C.I. Direct Yellow 142 | — | — | 0.4 | — | — | — | — | — | 3.2 | — | — | — | — | — | — | — |
| | Comparative dye | C.I. Acid Yellow 23 | — | — | — | — | — | — | — | — | — | — | — | — | — | — | 1.0 | 1.0 |
| | Glycerin | | 18.0 | 18.0 | 18.0 | 19.0 | 16.5 | 21.0 | 15.0 | 21.5 | 14.0 | 18.0 | 18.0 | 18.0 | 19.0 | 18.0 | 18.0 | 18.0 |
| | Polyethyleneglycol #200 | | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| | Triethylenglycol-n-butylether | | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| | OLFINE ® E1010(*1) | | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| | Water | | Balance | Balance | Balance | Balance | Balance | Balance | Balance | Balance | Balance | Balance | Balance | Balance | Balance | Balance | Balance | Balance |
| Weight ratio between dyes (dye (Y-1):dye (Y-2))(*2) | | | 75:25 | 60:40 | 90:10 | 75:25 | 75:25 | 75:25 | 75:25 | 75:25 | 60:40 | 95:5 | 50:50 | 100:0 | 100:0 | 100:0 | 75:25 | 75:25 |
| Total amount of dye to be blended (wt %) | | | 4.0 | 4.0 | 4.0 | 3.0 | 5.0 | 2.0 | 6.0 | 1.0 | 8.0 | 4.0 | 4.0 | 4.0 | 3.0 | 4.0 | 4.0 | 4.0 |

(*1)Acetylene glycol surfactant (ethylene oxide (10 mol) adduct of diol, manufactured by Nissin Chemical Co., Ltd.)
(*2)In some of water-based yellow inks, the weight ratio of a dye (Y-1) or a dye (Y-2) to a comparative dye is shown

TABLE 3

| | | | Water-based magenta ink | | | | | | | | | | | | | |
|---|---|---|---|---|---|---|---|---|---|---|---|---|---|---|---|---|
| | | | M1 | M2 | M3 | M4 | M5 | M6 | M7 | M8 | M9 | M10 | M11 | M12 | M13 | M14 |
| Ink composition (wt %) | Magenta dye (M-1) | Magenta dye (M-1a) | 2.8 | — | — | — | — | 1.0 | — | — | — | — | — | — | — | — |
| | | Magenta dye (M-1b) | — | 2.4 | — | — | — | 0.5 | — | — | — | 3.6 | — | — | — | — |
| | | Magenta dye (M-1c) | — | — | — | — | — | — | — | 3.0 | — | — | — | — | — | 2.8 |
| | | Magenta dye (M-1d) | — | — | 1.6 | — | — | — | — | — | — | 3.5 | — | 2.8 | — | 2.8 | — |
| | | Magenta dye (M-1e) | — | — | — | 0.8 | 0.4 | — | — | — | — | — | — | — | 2.4 | — |
| | Magenta dye (M-2) | Magenta dye (M-2a-1) | 1.2 | — | — | — | — | — | — | 3.0 | — | — | — | — | — | — |
| | | Magenta dye (M-2a-2) | — | 1.6 | — | — | — | — | 1.0 | — | — | — | — | — | — | — |
| | | Magenta dye (M-2a-3) | — | — | — | — | — | — | — | — | 3.5 | — | — | — | — | — |
| | | Magenta dye (M-2a-4) | — | — | 2.4 | — | — | 0.5 | — | — | — | — | — | — | — | — |
| | | Magenta dye (M-2a-5) | — | — | — | 3.2 | 3.6 | — | — | — | — | — | — | — | — | — |
| | | Magenta dye (M-2b-2) | — | — | — | — | — | — | — | — | — | — | 0.4 | — | — | — |
| | | Magenta dye (M-2b-4) | — | — | — | — | — | — | — | — | — | — | — | 1.2 | — | — |
| | | Magenta dye (M-2b-5) | — | — | — | — | — | — | — | — | — | — | — | — | 1.6 | — |
| | | C.I. Acid Red 1 | — | — | — | — | — | — | — | — | — | — | — | — | 1.2 | — |
| | | C.I. Acid Red 254 | — | — | — | — | — | — | — | — | — | — | — | — | — | 1.2 |
| | Glycerin | | 27.0 | 27.0 | 27.0 | 27.0 | 27.0 | 27.0 | 27.0 | 27.0 | 27.0 | 27.0 | 27.0 | 27.0 | 27.0 | 27.0 |
| | Dipropyleneglycol-n-propyl ether | | 2.0 | 2.0 | 2.0 | 2.0 | 2.0 | 2.0 | 2.0 | 2.0 | 2.0 | 2.0 | 2.0 | 2.0 | 2.0 | 2.0 |
| | OLFINE ® E1010(*1) | | 0.2 | 0.2 | 0.2 | 0.2 | 0.2 | 0.2 | 0.2 | 0.2 | 0.2 | 0.2 | 0.2 | 0.2 | 0.2 | 0.2 |
| | Water | | Balance | Balance | Balance | Balance | Balance | Balance | Balance | Balance | Balance | Balance | Balance | Balance | Balance | Balance |
| Weight ratio between dyes (dye (M-1):dye (M-2)) | | | 70:30 | 60:40 | 40:60 | 20:80 | 10:90 | 50:50 | 50:50 | 50:50 | 50:50 | 90:10 | 70:30 | 60:40 | 70:30 | 70:30 |
| Total amount of dye to be blended (wt %) | | | 4.0 | 4.0 | 4.0 | 4.0 | 4.0 | 1.0 | 2.0 | 6.0 | 7.0 | 4.0 | 4.0 | 4.0 | 4.0 | 4.0 |

(*1)Acetylene glycol surfactant (ethylene oxide (10 mol) adduct of diol, manufactured by Nissin Chemical Co., Ltd.)

TABLE 4

| | | | Water-based magenta ink | | | | | | | | | | |
|---|---|---|---|---|---|---|---|---|---|---|---|---|---|
| | | | M15c | M16c | M17c | M18c | M19c | M20c | M21c | M22c | M23c | M24c | M25c |
| Ink composition | Magenta dye (M-1) | Magenta dye (M-1b) | — | — | 2.0 | — | — | — | — | — | — | — | — |
| | | Magenta dye (M-1d) | — | — | — | 2.0 | — | — | — | — | — | — | — |
| | | Magenta dye (M-1e) | 4.0 | — | — | — | — | — | — | — | — | — | — |

TABLE 4-continued

|  |  |  | Water-based magenta ink | | | | | | | | | | |
|---|---|---|---|---|---|---|---|---|---|---|---|---|---|
|  |  |  | M15c | M16c | M17c | M18c | M19c | M20c | M21c | M22c | M23c | M24c | M25c |
| (wt %) | Magenta dye (M-2) | Magenta dye (M-2a-2) | — | — | — | — | 2.0 | — | — | — | — | — | — |
|  |  | Magenta dye (M-2a-3) | — | — | — | — | — | 2.0 | — | — | — | — | — |
|  |  | Magenta dye (M-2a-5) | — | 4.0 | — | — | — | — | — | — | — | — | — |
|  |  | Magenta dye (M-2b-5) | — | — | — | — | — | — | — | 4.0 | — | — | — |
|  |  | C.I. Acid Red 1 | — | — | — | — | — | — | — | — | 4.0 | — | — |
|  |  | C.I. Acid Red 254 | — | — | — | — | — | — | — | — | — | 4.0 | — |
|  | Comparative dye | C.I. Acid Red 52 | — | — | 2.0 | — | 2.0 | — | — | — | — | 4.0 | — |
|  |  | C.I. Acid Red 289 | — | — | — | 2.0 | — | 2.0 | — | — | — | — | 4.0 |
|  | Glycerin |  | 27.0 | 27.0 | 27.0 | 27.0 | 27.0 | 27.0 | 27.0 | 27.0 | 27.0 | 27.0 | 27.0 |
|  | Dipropyleneglycol-n-propyl ether |  | 2.0 | 2.0 | 2.0 | 2.0 | 2.0 | 2.0 | 2.0 | 2.0 | 2.0 | 2.0 | 2.0 |
|  | OLFINE ® E1010(*1) |  | 0.2 | 0.2 | 0.2 | 0.2 | 0.2 | 0.2 | 0.2 | 0.2 | 0.2 | 0.2 | 0.2 |
|  | Water |  | Balance | Balance | Balance | Balance | Balance | Balance | Balance | Balance | Balance | Balance | Balance |
| Weight ratio between dyes (dye (M-1):dye (M-2))(*2) | | | 100:0 | 100:0 | 50:50 | 50:50 | 50:50 | 50:50 | 100:0 | 100:0 | 100:0 | 0:100 | 0:100 |
| Total amount of dye to be blended (wt %) | | | 4.0 | 4.0 | 4.0 | 4.0 | 4.0 | 4.0 | 4.0 | 4.0 | 4.0 | 4.0 | 4.0 |

(*1)Acetylene glycol surfactant (ethylene oxide (10 mol) adduct of diol, manufactured by Nissin Chemical Co., Ltd.)
(*2)In some of water-based magenta inks, the weight ratio of a dye (M-1) or a dye (M-2) to a comparative dye is shown

TABLE 5

|  |  |  | Water-based cyan ink | | | | | | | | | | |
|---|---|---|---|---|---|---|---|---|---|---|---|---|---|
|  |  |  | C1 | C2 | C3 | C4 | C5 | C6 | C7 | C8 | C9 | C10 | C11 |
| Ink composition (wt %) | Cyan dye (C-1) | Cyan dye (C-1a) | 4.0 | — | 3.0 | 3.5 | 4.75 | 4.9 | — | — | — | — | — |
|  |  | Cyan dye (C-1b) | — | — | — | — | — | — | 0.8 | 1.6 | 4.8 | 5.6 | 1.0 |
|  |  | Cyan dye (C-1c) | — | — | — | — | — | — | — | — | — | — | — |
|  |  | Cyan dye (C-1d) | — | — | — | — | — | — | — | — | — | — | — |
|  |  | Cyan dye (C-1e) | — | 4.5 | — | — | — | — | — | — | — | — | — |
|  | Cyan dye (C-2) | Cyan dye (C-2a-1) | 1.0 | — | 2.0 | 1.5 | 0.25 | 0.1 | — | — | — | — | — |
|  |  | Cyan dye (C-2a-2) | — | — | — | — | — | — | 0.2 | 0.4 | 1.2 | 1.4 | — |
|  |  | Cyan dye (C-2a-5) | — | 0.5 | — | — | — | — | — | — | — | — | — |
|  |  | Cyan dye (C-2b-2) | — | — | — | — | — | — | — | — | — | — | — |
|  |  | Cyan dye (C-2b-3) | — | — | — | — | — | — | — | — | — | — | — |
|  |  | C.I. Direct Blue 199 | — | — | — | — | — | — | — | — | — | — | — |
|  |  | C.I. Direct Blue 86 | — | — | — | — | — | — | — | — | — | — | — |
|  | Comp. dye | C.I. Acid Blue 9 | — | — | — | — | — | — | — | — | — | — | — |
|  |  | C.I. Acid Blue 74 | — | — | — | — | — | — | — | — | — | — | — |
|  | Glycerin |  | 15.0 | 15.0 | 15.0 | 15.0 | 15.0 | 15.0 | 20.0 | 20.0 | 13.0 | 12.0 | 20.0 |
|  | Polyethyleneglycol #200 |  | 10.0 | 10.0 | 10.0 | 10.0 | 10.0 | 10.0 | 10.0 | 10.0 | 10.0 | 10.0 | 10.0 |
|  | Triethylenglycol-n-butylether |  | 3.0 | 3.0 | 3.0 | 3.0 | 3.0 | 3.0 | 3.0 | 3.0 | 3.0 | 3.0 | 3.0 |
|  | OLFINE ® E1010(*1) |  | 0.2 | 0.2 | 0.2 | 0.2 | 0.2 | 0.2 | 0.2 | 0.2 | 0.2 | 0.2 | 0.2 |
|  | Water |  | balance | balance | balance | balance | balance | balance | balance | balance | balance | balance | balance |
| Weight ratio between dyes (dye (C-1):dye (C-2))(*2) | | | 80:20 | 90:10 | 60:40 | 70:30 | 95:5 | 98:2 | 80:20 | 80:20 | 80:20 | 80:20 | 100:0 |
| Total amount of dye to be blended (wt %) | | | 5.0 | 5.0 | 5.0 | 5.0 | 5.0 | 5.0 | 1.0 | 2.0 | 6.0 | 7.0 | 1.0 |

|  |  |  | Water-based cyan ink | | | | | | | | | |
|---|---|---|---|---|---|---|---|---|---|---|---|---|
|  |  |  | C12 | C13 | C14 | C15 | C16 | C17 | C18 | C19 | C20 | C21 |
| Ink composition (wt %) | Cyan dye (C-1) | Cyan dye (C-1a) | — | 5.0 | — | — | — | — | — | — | 4.0 | 4.0 |
|  |  | Cyan dye (C-1b) | — | — | — | — | 4.0 | — | — | — | — | — |
|  |  | Cyan dye (C-1c) | 2.0 | — | — | — | — | 4.0 | — | — | — | — |
|  |  | Cyan dye (C-1d) | — | — | 6.0 | — | — | — | 3.75 | — | — | — |
|  |  | Cyan dye (C-1e) | — | — | — | 7.0 | — | — | — | 4.5 | — | — |
|  | Cyan dye (C-2) | Cyan dye (C-2a-1) | — | — | — | — | — | — | — | — | — | — |
|  |  | Cyan dye (C-2a-2) | — | — | — | — | — | — | — | — | — | — |
|  |  | Cyan dye (C-2a-5) | — | — | — | — | — | — | — | — | — | — |
|  |  | Cyan dye (C-2b-2) | — | — | — | — | 1.0 | — | — | — | — | — |
|  |  | Cyan dye (C-2b-3) | — | — | — | — | — | 1.0 | — | — | — | — |
|  |  | C.I. Direct Blue 199 | — | — | — | — | — | — | 1.25 | — | — | — |
|  |  | C.I. Direct Blue 86 | — | — | — | — | — | — | — | 0.5 | — | — |
|  | Comp. dye | C.I. Acid Blue 9 | — | — | — | — | — | — | — | — | 1.0 | — |
|  |  | C.I. Acid Blue 74 | — | — | — | — | — | — | — | — | — | 1.0 |
|  | Glycerin |  | 20.0 | 15.0 | 13.0 | 12.0 | 15.0 | 15.0 | 15.0 | 15.0 | 15.0 | 15.0 |
|  | Polyethyleneglycol #200 |  | 10.0 | 10.0 | 10.0 | 10.0 | 10.0 | 10.0 | 10.0 | 10.0 | 10.0 | 10.0 |
|  | Triethylenglycol-n-butylether |  | 3.0 | 3.0 | 3.0 | 3.0 | 3.0 | 3.0 | 3.0 | 3.0 | 3.0 | 3.0 |
|  | OLFINE ® E1010(*1) |  | 0.2 | 0.2 | 0.2 | 0.2 | 0.2 | 0.2 | 0.2 | 0.2 | 0.2 | 0.2 |
|  | Water |  | balance | balance | balance | balance | balance | balance | balance | balance | balance | balance |

TABLE 5-continued

| Weight ratio between dyes (dye (C-1):dye (C-2))(*2) | 100:0 | 100:0 | 100:0 | 100:0 | 80:20 | 80:20 | 75:25 | 90:10 | 80:20 | 80:20 |
|---|---|---|---|---|---|---|---|---|---|---|
| Total amount of dye to be blended (wt %) | 2.0 | 5.0 | 6.0 | 7.0 | 5.0 | 5.0 | 5.0 | 5.0 | 5.0 | 5.0 |

(*1)Acetylene glycol surfactant (ethylene oxide (10 mol) adduct of diol, manufactured by Nissin Chemical Co., Ltd.)
(*2)In some of water-based cyan inks, the weight ratio of a dye (C-1) or a dye (C-2) to a comparative dye is show

TABLE 6

| | | | Water-based cyan ink | | | | | | | |
|---|---|---|---|---|---|---|---|---|---|---|
| | | | C22c | C23c | C24c | C25c | C26c | C27c | C28c | C29c |
| Ink compo- sition (wt %) | Cyan dye (C-2) | Cyan dye (C-2a-1) | 5.0 | 4.0 | 4.0 | — | — | — | — | — |
| | | Cyan dye (C-2b-2) | — | — | — | 5.0 | — | — | — | — |
| | | C.I. Direct Blue 199 | — | — | — | — | 5.0 | — | — | — |
| | | C.I. Direct Blue 86 | — | — | — | — | — | 5.0 | — | — |
| | Comp. dye | C.I. Acid Blue 9 | — | 1.0 | — | — | — | — | 5.0 | — |
| | | C.I. Acid Blue 74 | — | — | 1.0 | — | — | — | — | 5.0 |
| | Glycerin | | 15.0 | 15.0 | 15.0 | 15.0 | 15.0 | 15.0 | 15.0 | 15.0 |
| | Polyethyleneglycol #200 | | 10.0 | 10.0 | 10.0 | 10.0 | 10.0 | 10.0 | 10.0 | 10.0 |
| | Triethylenglycol-n-butylether | | 3.0 | 3.0 | 3.0 | 3.0 | 3.0 | 3.0 | 3.0 | 3.0 |
| | OLFINE ® E1010(*1) | | 0.2 | 0.2 | 0.2 | 0.2 | 0.2 | 0.2 | 0.2 | 0.2 |
| | Water | | balance | balance | balance | balance | balance | balance | balance | balance |
| Weight ratio between dyes (dye (C-1):dye (C-2))(*2) | | | 100:0 | 80:20 | 80:20 | 100:0 | 100:0 | 100:0 | 0:100 | 0:100 |
| Total amount of dye to be blended (wt %) | | | 5.0 | 5.0 | 5.0 | 5.0 | 5.0 | 5.0 | 5.0 | 5.0 |

(*1)Acetylene glycol surfactant (ethylene oxide (10 mol) adduct of diol, manufactured by Nissin Chemical Co., Ltd.)
(*2)In some of water-based cyan inks, the weight ratio of a dye (C-1) or a dye (C-2) to a comparative dye is shown Examples 1 to 19 and Comparative Examples 1 to 11

[Configuration of Water-Based Ink Set for Ink-Jet Recording]

As summarized in Tables 7 and 8, water-based ink sets for ink-jet recording were configured by combining a water-based yellow ink, a water-based magenta ink, and a water-based cyan ink.

[Evaluation of Water-Based Ink Set for Ink Jet Recording]

With respect to the water-based ink sets of examples and comparative examples, (a) storing stability evaluation, (b) color developing properties evaluation, (c) ozone resistance evaluation, (d) light resistance evaluation, (e) ejection stability evaluation, and (f) comprehensive evaluation were conducted by the following methods. Samples used for (c) ozone resistance evaluation and (d) light resistance evaluation were prepared as follows.

First, ink cartridges were filled with the water-based yellow ink, the water-based magenta ink, and the water-based cyan ink that configure the respective water-based ink sets of examples and comparative examples. Next, each of the ink cartridges was attached to a digital multi-function center DCP-385C mounted an ink-jet printer manufactured by Brother Industries, Ltd. Then, a single color gradation sample of each of the water-based inks was printed on a glossy photo paper BP71GA manufactured by Brother Industries, Ltd., and a single color patch of each of the colors having an initial OD value of 1.0 was thereby obtained. The OD value was measured with a spectrophotometer, Spectrolino (light source: $D_{65}$; observer: 2°; and status A), manufactured by GretagMacbeth.

(a) Evaluation of Storing Stability

An absorbance at a maximum absorption wavelength of a diluent that was obtained by diluting 1600 times each of the water-based inks that configure the respective water-based ink set of examples and comparative examples with pure water was measured using an UV-VIS-NIR spectrophotometer UV 3600 manufactured by Shimadzu corporation. A measuring cell having a cell length of 10 mm was used for the measurement of the absorbance. Then, the water-based inks are poured in airtight containers, respectively, and the airtight containers are stored for 2 weeks at 60° C. An absorbance of eluent that was obtained by diluting 1600 times each of the water-based inks after the storage with pure water was measured in the same manner as that before the storage. Then, an absorbance decrease rate (%) was determined based on the following equation (I), and storing stability of the water-based ink set was evaluated according to the following evaluation criteria. It may be said that storing stability is superior as the absorbance decrease rate is small.

$$\text{Absorbance decrease rate}(\%) = \{(X-Y)/Y \times 100\} \quad (I)$$

X: Absorbance before storage
Y: Absorbance after storage

Criteria for Evaluation of Storing Stability

AA: all the water-based inks had an absorbance decrease rate of less than 5%

A: at least one of the water-based inks had an absorbance decrease rate of 5% or more and less than 10%, and the other had an absorbance decrease rate of less than 5%

C: at least one of the water-based inks had an absorbance decrease rate of 10% or more (b) Evaluation of Color Developing Properties Ink cartridges were filled with the water-based yellow ink, the water-based magenta ink, and the water-based cyan ink that configure the respective water-based ink sets of examples and comparative examples. Next, each of the ink cartridges was attached to the digital multi-function center DCP-385C. Then, a natural image sample (JIS SCID No. 2) was printed on the glossy photo paper BP71GA. Whether or not the respective single colors and colors obtained by combining the respective colors are expressed was evaluated according to the following criteria by observing this natural image sample by visual check.

Criteria for evaluation of color developing properties

AA: the respective single colors and colors obtained by combining the respective colors were expressed sufficiently A: the respective single colors were expressed sufficiently C: the respective single colors and colors obtained by combining the respective colors were not expressed sufficiently (c) Evaluation of Ozone Resistance Using an ozone weather meter, OMS-H, manufactured by SUGA TEST INSTRUMENTS CO., LTD, a single color patch of each of the colors was allowed to stand for 40 hours under the conditions in which the ozone concentration was 1 ppm, the temperature in the chamber was 24° C., and the relative humidity in the cham was 60%. Next, the OD value of the single color patch after being allowed to stand was measured in the same manner as described above. Then, the OD value decrease rate (%) was determined according to the following equation (II), and the ozone resistance was evaluated according to the following evaluation criteria. The smaller the OD value decrease rate, the less the deterioration in image quality, which means the ozone resistance of the water-based ink is higher.

$$OD \text{ value decrease rate}(\%)=\{(X-Y)/X\}\times 100 \quad \text{(II)}$$

X: 1.0 (initial OD value)

Y: OD value after being allowed to stand

Criteria for Evaluation of Ozone Resistance

AA: all of the water-based ink had an OD value decrease rate of less than 20%, and the maximum difference between OD value decrease rates of the respective water-based inks was less than 20%

A: all of the water-based inks had an OD value decrease rate of 20% or more and less than 30%, and the maximum difference between OD value decrease rates of the respective water-based inks was less than 20%

C: at least one of the water-based inks had an OD value decrease rate of 30% or more, or the maximum difference between OD value decrease rates of the respective water-based inks was 20% or more (d) Evaluation of Light Resistance Using a super xenon weather meter, SX75, manufactured by SUGA TEST INSTRUMENTS CO., LTD, a single color patch of each of the colors was irradiated with light from a xenon lamp for 100 hours under the conditions in which the temperature in the chamber was 23° C., the relative humidity in the chamber was 50%, and the illuminance was 81 klx. Next, the OD value of the single color patch after irradiation was measured in the same manner as described above. Then, the OD value decrease rate (%) was determined according to the following equation (III), and the light resistance was evaluated according to the following evaluation criteria. The smaller the OD value decrease rate, the less the deterioration in image quality, which means the light resistance of the water-based ink is higher.

$$OD \text{ value decrease rate}(\%)=\{(X-Y)/X\}\times 100 \quad \text{(III)}$$

X: 1.0 (initial OD value)

Y: OD value after irradiation

Criteria for Evaluation of Light Resistance

AA: all of the water-based inks had an OD value decrease rate of less than 20%, and the maximum difference between OD value decrease rates of the respective water-based inks was less than 20%

A: all of the water-based inks had an OD value decrease rate of 20% or more and less than 30%, and the maximum difference between OD value decrease rate of the respective water-based inks was less than 20%.

C: at least one of the water-based inks had an OD value decrease rate of 30% or more, or the maximum difference between OD value decrease rates of the respective water-based inks was 20% or more.

(e) Evaluation of Ejection Stability

With respect to each of the water-based yellow ink, the water-based magenta ink, and the water-based cyan ink that configure the respective water-based ink sets of examples and comparative examples, continuous recording of 100 million dots (approximately 30,000 sheets) was carried out on office paper W (recording paper) manufactured by FUJITSU CoWorCo LIMITED using the digital multi-function center DCP-385C. The result of the continuous recording was evaluated according to the following evaluation criteria. The term "non-ejection" denotes the state where the nozzle of the ink-jet head is clogged and the water-based ink is not ejected. The term "ejection deflection" denotes the state where the nozzle of the ink-jet head is partially clogged and thereby the water-based ink is ejected not perpendicularly to the recording paper but obliquely thereto.

Criteria for Evaluation of Ejection Stability

AA: Neither non-ejection nor ejection deflection of all of the water-based inks occurred during the continuous recording.

A: Non-ejection and/or ejection deflection of at least one of the water-based inks occurred to a small extent during the continuous recording but the non-ejection and/or ejection deflection was restored by five purges or fewer.

C: Non-ejection and/or ejection deflection of at least one of the water-based inks occurred to a large extent during the continuous recording and the non-ejection and/or ejection deflection was not restored by five purges.

(f) Comprehensive Evaluation

With respect to the respective water-based ink sets, a comprehensive evaluation was made according to the following evaluation criteria based on the results of the evaluations (a) to (e).

Criteria for Comprehensive Evaluation

G: There was no C for evaluation results

NG: There was a C for any of evaluation results

The configurations and the evaluation results of the respective water-based ink sets of examples are summarized in Table 7. Further, the configurations and the evaluation results of the respective water-based ink sets of comparative examples are summarized in Table 8.

TABLE 7

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Water-based ink set | Water-based yellow ink | Y1 | Y2 | Y3 | Y4 | Y5 | Y6 | Y7 | Y8 | Y9 | Y10 |
|  | Water-based magenta ink | M1 | M2 | M3 | M4 | M5 | M6 | M7 | M8 | M9 | M10 |
|  | Water-based cyan ink | C1 | C2 | C3 | C4 | C5 | C6 | C7 | C8 | C9 | C10 |

TABLE 7-continued

| Evaluation | | | | | | | | | | | |
|---|---|---|---|---|---|---|---|---|---|---|---|
| | Storing stability evaluation | AA | AA | AA | AA | AA | AA | AA | AA | A | A |
| | Color developing properties evaluation | A | AA | AA | AA | AA | AA | AA | A | AA | AA |
| | Ozone resistance evaluation | AA | AA | AA | AA | AA | A | A | A | A | AA |
| | Light resistance evaluation | AA | AA | AA | AA | AA | A | AA | A | AA | AA |
| | Ejection stability evaluation | AA | AA | A | AA | A | AA | AA | AA | A | A |
| | Comprehensive evaluation | G | G | G | G | G | G | G | G | G | G |

| | | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|
| Water-based ink set | Water-based yellow ink | Y11 | Y1 | Y2 | Y3 | Y4 | Y5 | Y6 | Y7 | Y8 |
| | Water-based magenta ink | M11 | M12 | M13 | M14 | M1 | M2 | M3 | M4 | M5 |
| | Water-based cyan ink | C11 | C12 | C13 | C14 | C15 | C16 | C17 | C18 | C19 |
| Evaluation | Storing stability evaluation | AA | AA | AA | AA | A | AA | AA | AA | AA |
| | Color developing properties evaluation | A | A | A | A | A | AA | AA | AA | A |
| | Ozone resistance evaluation | A | AA | AA | AA | AA | AA | AA | AA | A |
| | Light resistance evaluation | A | AA | AA | AA | AA | AA | AA | AA | A |
| | Ejection stability evaluation | AA | AA | AA | AA | AA | AA | AA | AA | A |
| | Comprehensive evaluation | G | G | G | G | G | G | G | G | G |

TABLE 8

| | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|---|
| Water-based ink set | Water-based yellow ink | Y12c | Y13c | Y14c | Y15c | Y16c | Y1 | Y2 | Y4 | Y6 | Y8 | Y10 |
| | Water-based magenta ink | M15c | M16c | M17c | M18c | M19c | M20c | M21c | M22c | M23c | M24c | M25c |
| | Water-based cyan ink | C22c | C20 | C21 | C23c | C24c | C25c | C26c | C27c | C28c | C29c | C1 |
| Evaluation | Storing stability evaluation | C | AA | AA | AA | AA | AA | AA | AA | AA | AA | A |
| | Color developing properties evaluation | C | C | C | AA | C | AA | AA | AA | AA | C | AA |
| | Ozone resistance evaluation | AA | C | C | C | C | C | C | C | C | C | C |
| | Light resistance evaluation | AA | C | C | C | C | C | C | C | C | C | C |
| | Ejection stability evaluation | C | C | AA | C | C | AA | AA | AA | AA | AA | AA |
| | Comprehensive evaluation | NG | NG | NG | NG | NG | NG | NG | NG | NG | NG | NG |

As summarized in Table 7, water-based ink sets of Examples 1 to 19 showed favorable results in all of the storing stability evaluation, color developing properties evaluation, the ozone resistance evaluation, the light resistance evaluation, and ejection stability evaluation. Further, in water-based inks of Examples 1 to 19, a color balance after fading of colors also was favorable.

On the other hand, as summarized in Table 8, since the water-based yellow ink does not contain the yellow dye (Y-2) in the water-based ink set of Comparative Example 1, the water-basead yellow ink showed an unfavolable result in storing stability. Further, since the water-based magenta ink does not contain the magenta dye (M-2) in the same, the water-based magenta ink showed a poor result in color developing properties. Furthermore, the water-based cyan ink containing no cyan dye (C-1) in the same showed poor results in ejection stability.

The water-based yellow ink containing no yellow dye (Y-1) in the water-based ink set of Comparative Example 2 showed unfavolable results in color developing properties, ozone resistance, and light resistance. Further, the water-based magenta ink containing no magenta dye (M-1) in the same showed a poor result in ejection stability. Furthermore, with respect to the ozone resistance evaluation and the light resistance evaluation, differences between OD value decrease rates of the water-based yellow ink and the water-based magenta ink, those of the water-based yellow ink and the water-based cyan ink, and those of the water-based magenta ink and the water-based cyan ink were large, and a color balance after fading of the colors was lost.

The water-based yellow ink containing no yellow dye (Y-1) in the water-based ink set of Comparative Example 3 showed unfavolable results in ozone resistance and light resistance. Further, the water-based magenta dye containing C. I. Acid Red 52 instead of the magenta dye (M-2) in the same showed poor results in ozone resistance and light resistance. Furthermore, with respect to the ozone resistance evaluation and the light resistance evaluation, differences between OD value decrease rates of the water-based yellow ink and the water-based magenta ink and those of the water-based yellow ink and the water-based cyan ink were large, and a color balance after fading of the colors was lost.

The water-based yellow ink containing C. I. Acid Yellow 23 instead of the yellow dye (Y-2) in the water-based ink set of Comparative Example 4 showed unfavolable results in ozone resistance and light resistance. Further, the water-based magenta ink containing C. I. Acid Red 289 instead of the magenta dye (M-2) in the same showed poor results in ozone resistance and light resistance. Furthermore, the water-based cyan ink containing no cyan dye (C-1) in the same showed poor results in ozone resistance and light resistance and unfavolable results in ejection stability. With respect to the ozone resistance evaluation and the light resistance evaluation, differences between OD value decrease rates of the water-based yellow ink and the water-based magenta ink and those of the water-based yellow ink and the water-based cyan ink were large, and a color balance after fading of the colors was lost.

The water-based yellow ink containing C. I. Acid Yellow 23 instead of the yellow dye (Y-1) in the waber-based ink set of Comparative Example 5 showed unfavolable results in ozone resistance and light resistance. Further, the water-based magenta ink containing C. I. Acid Red 52 instead of the magenta dye (M-1) in the same showed poor results in ozone resistance and light resistance. Furthermore, the water-based cyan ink containing no cyan dye (C-1) in the same showed unfavolable results in color developing properties and ejection stability and poor results in ozone resistance and light resistance. With respect to the ozone resistance evaluation and the light resistance evaluation, differences between OD value decrease rates of the water-based yellow ink and the water-based magenta ink and those of the water-based yellow ink and the water-based cyan ink were large, and a color balance after fading of the colors was lost.

The water-based magenta ink containing C. I. Acid Red 289 instead of the magenta dye (M-1) in the water-based ink set of Comparative Example 6 showed poor results in ozone resistance and light resistance. Further, the water-based cyan ink containing no cyan dye (C-1) in the same showed an unfavolable result in ozone resistance. Furthermore, with respect to the ozone resistance evaluation and the light resistance evaluation, differences between OD value decrease rates of the water-based yellow ink and the water-based magenta ink and those of the water-based magenta ink and the water-based cyan ink were large. With respect to the ozone resistance evaluation, a difference between OD value decrease rates of the water-based yellow ink and the water-based cyan ink was large. A color balance after fading of the colors was lost.

The water-based magenta ink containing no mageanta dye (M-1) in Comparative Example 7 showed unfavorable results in ozone resistance and light resistance. Further, the water-based cyan ink containing no cyan dye (C-1) in the same showed an unfavolable result in ozone resistance. With respect to the ozone resistance evaluation and the light resistance evaluation, a difference between OD value decrease rates of the water-based yellow ink and the water-based magenta ink was large. With respect to the ozone resistance evaluation, a difference between OD value decrease rate of the water-based yellow ink and the water-based cyan ink was large. With respect to the light resistance evaluation, a difference between OD value decrease rates of the water-based magenta ink and the water-based cyan ink was large. A color balance after fading of the colors was lost.

The water-based magenta ink containing no magenta dye (M-1) in the water-based ink set of Comparative Example 8 showed unfavolable results in ozone resistance and light resistance. Further, the water-based cyan ink containing no cyan dye (C-1) in the same showed an unfavolable result in ozone resistance. Furthermore, with respect to the ozone resistance evaluation and the light resistance evaluation, a difference between OD value decrease rates of the water-based yellow ink and the water-based magenta ink was large. With respect to the ozone resistance evaluation, a difference between OD value decrease rates of the water-based yellow ink and the water-based cyan ink was large. With respect to the light resistance evaluation, a difference between OD value decrease rates of the water-based magenta ink and the water-based cyan ink was large. A color balance after fading of the colors was lost.

The water-based magenta ink containing no magenta dye (M-1) in the water-based ink set of Comparative Example 9 showed unfavolable results in ozone resistance and light resistance. Further, the water-based cyan ink containing no cyan dye (C-1) in the same showed poor results in ozone resistance and light resistance. Furthermore, with respect to the ozone resistance evaluation and the light resistance evaluation, differences between OD value decrease rates of the water-based yellow ink and the water-based magenta ink, those of the water-based yellow ink and the water-based cyan ink, and those of the water-based magenta ink and the water-based cyan ink were large, and a color balance after fading of the colors was lost.

The water-based mageanta ink containing no magenta dye (M-1) and the magenta dye (M-2) in Comparative Example 10 showed poor results in ozone resistance and light resistance. Further, the water-based cyan ink containing no cyan dye (C-1) in the same showed an unfavorable result in color developing properties and poor results in ozone resistance and light resistance. Furthermore, with respect to the ozone resistance evaluation and the light resistance evaluation, differences between OD value decrease rates of the water-based yellow ink and the water-based magenta ink and those of the water-based yellow ink and the water-based cyan ink were large, and a color balance after fading of the colors was lost.

The water-based magenta ink containing no magenta dye (M-1) and the magenta dye (M-2) in the water-based ink set of Comparative Example 11 showed poor results in ozone resistance and light resistance. Further, with respect to the ozone resistance evaluation and the light resistance evaluation, differences between OD value decrease rates of the water-based yellow ink and the water-based magenta ink and those of the water-based magenta ink and the water-based cyan ink were large, and a color balance after fading of the colors was lost.

It will be obvious to those having skill in the art that many changes may be made in the aforementioned details of the particular aspects described herein without departing from the spirit or scope of the invention as defined in the appended claims.

What is claimed is:
1. A water-based ink set for ink-jet recording, comprising:
a water-based yellow ink;
a water-based magenta ink; and
a water-based cyan ink, wherein
the water-based yellow ink contains a yellow coloring agent, water, and a water-soluble organic solvent;
the yellow coloring agent contains the following yellow dye (Y-1) and the following yellow dye (Y-2);
the water-based magenta ink contains a magenta coloring agent, water, and a water-soluble organic solvent;
the magenta coloring agent contains the following magenta dye (M-1) and the following magenta dye (M-2); and
the water-based cyan ink contains a cyan coloring agent, water, and a water-soluble organic solvent;
the cyan coloring agent contains the following cyan dye (C-1),
Yellow dye (Y-1): a dye represented by the general formula (Y-1)
Yellow dye (Y-2): at least one dye selected from the group consisting of C. I. Direct
Yellow 86, C. I. Direct Yellow 132, and C. I. Direct Yellow 142
Magenta dye (M-1): a dye represented by the general formula (M-1)
Magenta dye (M-2): at least one dye selected from the group consisting of dyes represented by the general formula (M-2a), dyes represented by the general formula (M-2b), C. I. Acid Red 1, and C. I. Acid Red 254

Cyan dye (C-1): a dye represented by the general formula (C-1)

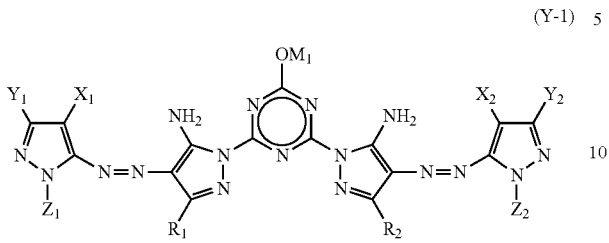
(Y-1)

where in the general formula (Y-1),
$R_1$, $R_2$, $Y_1$, and $Y_2$ each represent a monovalent group, and may be identical to or different from each other;
$X_1$ and $X_2$ each represent an electron attractive group, and may be identical to or different from each other;
$Z_1$ and $Z_2$ each represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and may be identical to or different from each other; and
$M_1$ represents a hydrogen atom or a cation,

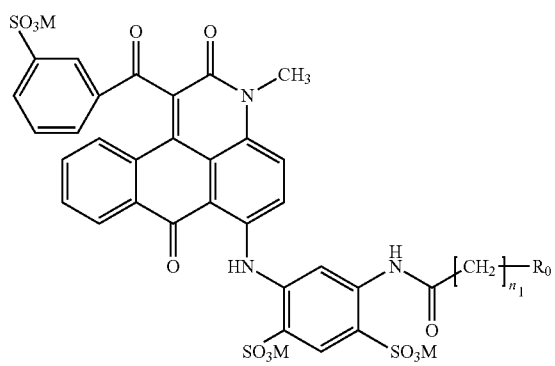
(M-1)

where in the general formula (M-1),
$n_1$ is 1 or 2;
three Ms each represent sodium or ammonium, and may be identical to or different from each other; and
$R_0$ represents a monoalkylamino group having 1 to 8 carbon atoms, substituted with a carboxy group,

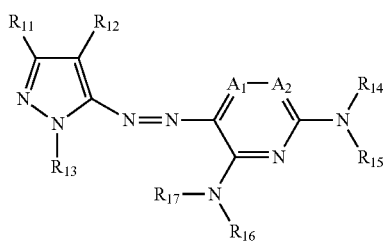
(M-2a)

where in the general formula (M-2a), $R_{11}$ represents a hydrogen atom, a substituted or unsubstituted alkyl group, or a substituted or unsubstituted aryl group;
$R_{12}$ represents a hydrogen atom, a halogen atom, or a cyano group;
$R_{13}$ represents a hydrogen atom, a substituted or unsubstituted alkyl group, a substituted or unsubstituted aryl group, or a substituted or unsubstituted heterocyclic group;
$R_{14}$, $R_{15}$, $R_{16}$, and $R_{17}$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, and may be identical to or different from each other, provided that $R_{14}$ and $R_{15}$ are not both hydrogen atoms, and that $R_{16}$ and $R_{17}$ are not both hydrogen atoms; and
$A_1$ and $A_2$ are both substituted or unsubstituted carbon atoms, or one of $A_1$ and $A_2$ is a substituted or unsubstituted carbon atom and the other is a nitrogen atom,

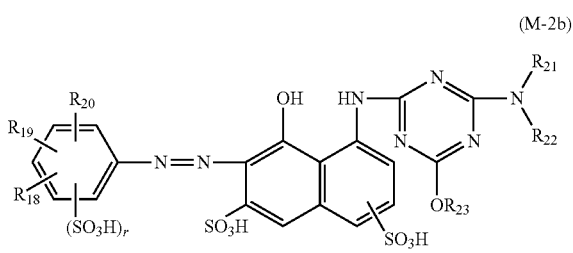
(M-2b)

where in the general formula (M-2b),
r is 0, 1, or 2;
$R_{18}$, $R_{19}$, and $R_{20}$ each represent a substituted or unsubstituted alkyl group, a substituted or unsubstituted alkoxy group, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonic acid ester group, a substituted or unsubstituted alkylsulfonyl group, a substituted or unsubstituted arylsulfonyl group, a carboxyl group, or a carboxylic acid ester group, and may be identical to or different from each other; and $R_{21}$, $R_{22}$, and $R_{23}$ each represent a hydrogen atom, a substituted or unsubstituted alkyl group, a substituted or unsubstituted alkenyl group, a substituted or unsubstituted aryl group, a substituted or unsubstituted aralkyl group, a substituted or unsubstituted alicyclic group, or a substituted or unsubstituted heterocyclic group, and may be identical to or different from each other,

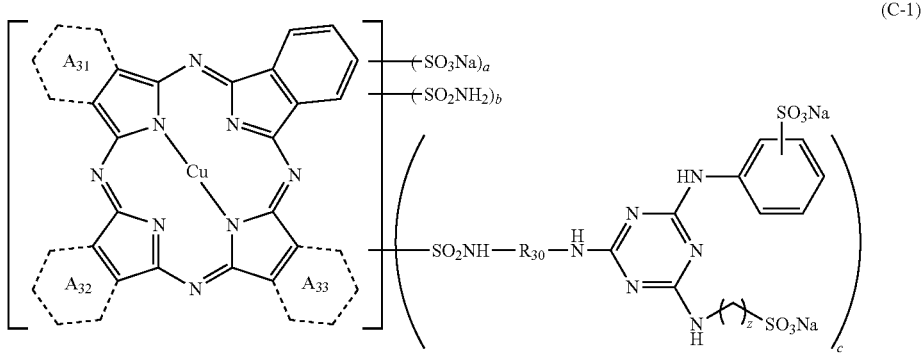

(C-1)

where in the general formula (C-1),
rings $A_{31}$, $A_{32}$, and $A_{33}$ each represent a benzene ring, a 2,3-pyridine ring, or a 3,2-pyridine ring; at least one of rings $A_{31}$, $A_{32}$, and $A_{33}$ represents a 2,3-pyridine ring or a 3,2-pyridine ring; and the rings $A_{31}$, $A_{32}$, and $A_{33}$ may be identical to or different from each other;
a satisfies $0 \leq a \leq 4$; b satisfies $0 \leq b \leq 4$; c satisfies $0 \leq c \leq 4$; a, b, and c satisfy $0 \leq a+b+c \leq 4$;
z is an integer satisfying $1 \leq z \leq 3$; and
$R_{30}$ represents a straight chain alkyl group having 1 to 6 carbon atoms.

2. The water-based ink set for ink-jet recording according to claim 1, wherein a weight ratio of the yellow dye (Y-1) to the yellow dye (Y-2) in the water-based yellow ink is in a range of about 50:50 to about 95:5 (yellow dye (Y-1): yellow dye (Y-2)).

3. The water-based ink set for ink-jet recording according to claim 1, wherein a weight ratio of the yellow dye (Y-1) to the yellow dye (Y-2) in the water-based yellow ink is in a range of about 60:40 to about 90:10 (yellow dye (Y-1): yellow dye (Y-2)).

4. The water-based ink set for ink-jet recording according to claim 1, wherein
the magenta dye (M-2) is a dye represented by, the general formula (M-2a), and
a weight ratio of the magenta dye (M-1) to the magenta dye (M-2) in the water-based magenta ink is in a range of about 60:40 to about 20:80 (magenta dye (M-1): magenta dye (M-2)).

5. The water-based ink set for ink-jet recording according to claim 1, wherein
the magenta dye (M-2) is at least one dye selected from the group consisting of dyes represented by the general formula (M-2b), C. I. Acid Red 1, and C. I. Acid Red 254, and
a weight ratio of the magenta dye (M-1) to the magenta dye (M-2) in the water-based magenta ink is in a range of about 70:30 to about 90:10 (magenta dye (M-1): magenta dye (M-2)).

6. The water-based ink set for ink-jet recording according to claim 1, wherein
the cyan coloring agent further contains the following cyan dye (C-2), and
a weight ratio of the cyan dye (C-1) to the cyan dye (C-2) in the water-based cyan ink is in a range of about 70:30 to about 95:5 (cyan dye (C-1): cyan dye (C-2)),
Cyan dye (C-2): at least one dye selected from the group consisting of dyes represented by the general formula (C-2a), dyes represented by the general formula (C-2b), C. I. Direct Blue 199, and C. I. Direct Blue 86

(C-2a)

where in the general formula (C-2a),
Pc (Cu) represents a copper phthalocyanine nucleus represented by the general formula (Pc);
$R_{31}$, $R_{32}$, $R_{33}$, and $R_{34}$ each represent a substituent selected from the group consisting of a —$SO_2R_a$, a —$SO_2NR_bR_c$, and a —$CO_2R_a$; $R_{31}$, $R_{32}$, $R_{33}$, and $R_{34}$ are not all identical to each other; at least one of $R_{31}$, $R_{32}$, $R_{33}$, and $R_{34}$ has an ionic hydrophilic group as a substituent; at least one of $R_{31}$, $R_{32}$, $R_{33}$, and $R_{34}$ is present on any of four benzene rings A, B, C, and D of the copper phthalocyanine nucleus represented by the general formula (Pc); $R_a$ represents a substituted or unsubstituted alkyl group; $R_b$ represents a hydrogen atom or a substituted or unsubstituted alkyl group; $R_c$ represents a substituted or unsubstituted alkyl group;
k satisfies $0<k<8$; l satisfies $0<l<8$; m satisfies $0 \leq m<8$; n satisfies $0 \leq n<8$; and k, l, m, and n satisfy $4 \leq k+l+m+n \leq 8$,

(C-2b)

where in the general formula (C-2b),
Pc (Cu) represents a copper phthalocyanine nucleus represented by the general formula (Pc);
$M_0$ represents any of lithium, sodium, potassium, and ammonium;
x satisfies $0<x<4$; y satisfies $0<y<4$; x and y satisfy $2 \leq x+y \leq 5$; and
a —$SO_3M_0$ and a —$SO_2NH_2$ are present on any of four benzene rings A, B, C, and D of the copper phthalocyanine nucleus represented by the general formula (Pc)

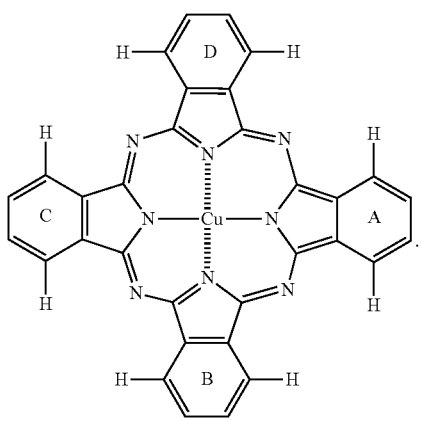

(Pc)

7. The water-based ink set for ink-jet recording according to claim 1, wherein
a total amount of the yellow coloring agent is about 2 wt % to about 6 wt % with respect to an amount of the water-based yellow ink;
a total amount of the magenta coloring agent is about 2 wt % to about 6 wt % with respect to an amount of the water-based magenta ink; and
a total amount of the cyan coloring agent is about 2 wt % to about 6 wt % with respect to an amount of the water-based cyan ink.

8. An ink cartridge, comprising:
containing portions for a water-based yellow ink, a water-based magenta ink, and a water-based cyan ink, respectively, wherein
the water-based yellow ink, the water-based magenta ink, and the water-based cyan ink are the water-based yellow ink, the water-based magenta ink, and the water-based cyan ink in the water-based ink set for ink-jet recording according to claim 1, respectively.

9. An ink-jet recording apparatus comprising:
an ink storing portion; and
an ink ejecting unit that ejects an ink stored in the ink storing portion, wherein
the ink cartridge according to claim 8 is stored in the ink storing portion.

\* \* \* \* \*